United States Patent
Otsuka

(10) Patent No.: US 12,112,453 B2
(45) Date of Patent: Oct. 8, 2024

(54) IMAGE DISPLAY CONTROL DEVICE, TRANSMITTING DEVICE, IMAGE DISPLAY CONTROL METHOD, AND PROGRAM FOR GENERATING A SUBSTITUTE IMAGE

(71) Applicant: Sony Interactive Entertainment Inc., Tokyo (JP)

(72) Inventor: Katsushi Otsuka, Aichi (JP)

(73) Assignee: Sony Interactive Entertainment Inc., Tokyo (JP)

(*) Notice: Subject to any disclaimer, the term of this patent is extended or adjusted under 35 U.S.C. 154(b) by 477 days.

(21) Appl. No.: 17/435,864

(22) PCT Filed: Dec. 25, 2019

(86) PCT No.: PCT/JP2019/050907
§ 371 (c)(1),
(2) Date: Sep. 2, 2021

(87) PCT Pub. No.: WO2020/194958
PCT Pub. Date: Oct. 1, 2020

(65) Prior Publication Data
US 2022/0148133 A1    May 12, 2022

(30) Foreign Application Priority Data
Mar. 25, 2019 (JP) ................. 2019-056321

(51) Int. Cl.
*G06T 3/4092* (2024.01)
*A63F 13/358* (2014.01)
*H04N 21/442* (2011.01)

(52) U.S. Cl.
CPC .......... *G06T 3/4092* (2013.01); *A63F 13/358* (2014.09); *H04N 21/442* (2013.01); *G09G 2340/0407* (2013.01)

(58) Field of Classification Search
None
See application file for complete search history.

(56) References Cited

U.S. PATENT DOCUMENTS

| 5,541,667 A | 7/1996 | Saito |
| 8,983,215 B2 | 3/2015 | Yamaguchi |
| (Continued) | | |

FOREIGN PATENT DOCUMENTS

| CA | 2329426 A1 | 10/1999 |
| JP | 5244468 A | 9/1993 |
| (Continued) | | |

OTHER PUBLICATIONS

International Search Report for corresponding PCT Application No. PCT/JP2019/050907, 4 pages, dated Mar. 24, 2020.

(Continued)

*Primary Examiner* — Joni Hsu
(74) *Attorney, Agent, or Firm* — Matthew B. Dernier, Esq.

(57) ABSTRACT

A substitute image generating section generates a substitute image corresponding to second image data on the basis of first image data. According to success or failure of reception of the second image data, a display control section causes either one of the to-be-displayed image generated on the basis of the second image data and the substitute image generated on the basis of the first image data to be displayed. The substitute image generating section starts the generation of the substitute image corresponding to the second image data based on the first image data before the success or failure of the reception of the second image data is confirmed.

12 Claims, 14 Drawing Sheets

(56) References Cited

U.S. PATENT DOCUMENTS

| | | |
|---|---|---|
| 2006/0271978 A1 | 11/2006 | Watanabe |
| 2007/0242080 A1 | 10/2007 | Hamada |
| 2009/0268823 A1* | 10/2009 | Dane .................... H04N 19/587 |
| | | 382/256 |
| 2010/0231797 A1 | 9/2010 | Jiang |
| 2013/0251277 A1 | 9/2013 | Yamaguchi |
| 2018/0205967 A1 | 7/2018 | Kim |
| 2019/0356940 A1* | 11/2019 | Mallett .................. H04N 19/33 |
| 2019/0358541 A1 | 11/2019 | Bronder |

FOREIGN PATENT DOCUMENTS

| | | |
|---|---|---|
| JP | 2006332759 A | 12/2006 |
| JP | 2007166479 A | 6/2007 |
| JP | 2007180759 A | 7/2007 |
| JP | 2012119950 A | 6/2012 |

OTHER PUBLICATIONS

Extended European Search Report for corresponding EP Application No. 19921445.3, 13 pages, dated Nov. 8, 2022.
Decision to Grant a Patent for corresponding JP Application No. 2021-508768, 5 pages, dated Feb. 22, 2022.

* cited by examiner

IMAGE DISPLAY CONTROL DEVICE, TRANSMITTING DEVICE, IMAGE DISPLAY CONTROL METHOD, AND PROGRAM FOR GENERATING A SUBSTITUTE IMAGE

TECHNICAL FIELD

The present invention relates to an image display control device, a transmitting device, an image display control method, and a program.

BACKGROUND ART

In the technology of cloud gaming services that has attracted attention in recent years, when a user who is playing a game performs operation on a terminal that can communicate with a cloud server on which a program of the game is executed, an operation signal according to the operation is transmitted from the terminal to the cloud server. Then, game processing including a process according to the operation signal, and the like is executed at the cloud server, and a play image representing a situation of plays of the game is generated. Then, data based on the play image is transmitted from the cloud server to the terminal, and an image generated on the basis of the data is displayed on the terminal.

SUMMARY

Technical Problem

Reception of data by terminals is unsuccessful in some cases for reasons that the data does not arrive at a terminal, the data received by a terminal is partially or entirely corrupt, and so on, due to the influence of an overload or connection instability of a server or a network.

Here, there is a risk of being unable to receive data by a timing when the data should be displayed if retransmission of the data is started after a failure of reception of the data is confirmed. In situations as in cloud gaming services and the like where low latency is required, the possibility of occurrence of such events is particularly high. Note that this applies not only to situations where cloud gaming services are provided, but generally to situations where communication of image-based data is performed.

The present invention has been made in view of the circumstance described above, and one of objects thereof is to provide an image display control device, a transmitting device, an image display control method, and a program. The image display control device, the transmitting device, the image display control method, and the program make it possible to reduce a risk of being unable to receive image-based data by a timing when the data should be displayed if retransmission of the data is started after a failure of reception of the data is confirmed.

Solution to Problem

In order to solve the problem described above, an image display control device according to the present invention includes an image data receiving section that repeatedly receives image data, a to-be-displayed-image generating section that generates a to-be-displayed image on the basis of the image data, a substitute image generating section that, on the basis of first image data that is the image data received at a first timing, generates a substitute image that is an image different from the to-be-displayed image generated on the basis of the first image data and that corresponds to second image data that is the image data planned to be received at a second timing that comes after the first timing, and a display control section that causes either one of the to-be-displayed image generated on the basis of the second image data and the substitute image generated on the basis of the first image data to be displayed according to success or failure of the reception of the second image data. The substitute image generating section starts the generation of the substitute image corresponding to the second image data based on the first image data before the success or failure of the reception of the second image data is confirmed.

In one mode of the present invention, the image data receiving section receives the image data representing a downscaled image obtained by downscaling an original image, the to-be-displayed-image generating section generates the to-be-displayed image having a resolution higher than a resolution of the downscaled image, and the substitute image generating section generates the substitute image having a resolution higher than the resolution of the downscaled image.

In addition, in one mode of the present invention, in a case where part of the second image data is received, the substitute image generating section generates the substitute image further on the basis of the part.

Alternatively, the image data receiving section further receives feature-amount data that is associated with the image data and that represents at least one of a feature amount of the original image and a feature amount that is a parameter used in encoding of the downscaled image, and the to-be-displayed-image generating section generates the to-be-displayed image on the basis of the image data, and the feature-amount data associated with the image data.

In this case, the substitute image generating section may generate the substitute image on the basis of the first image data, and the feature-amount data associated with the first image data.

Alternatively, the substitute image generating section may generate the substitute image on the basis of the second image data, and the feature-amount data associated with the second image data.

Alternatively, in a case where part of the second image data and the feature-amount data associated with the second image data is received, the substitute image generating section generates the substitute image further on the basis of the part.

Here, the feature-amount data may include data representing at least one of a feature point of the original image, an edge strength, a depth of each pixel included in the original image, a texture type of the original image, an optical flow, and information representing in which direction and at what speed a rectangular region in an image is moving.

In addition, in one mode of the present invention, the substitute image generating section generates the substitute image on the basis of a chronologically ordered series of the received image data.

In addition, a transmitting device according to the present invention includes an image data generating section that generates image data representing a downscaled image obtained by downscaling an original image, and a transmitting section that transmits image data generated by the image data generating section to an image display control device. The image display control device includes an image data receiving section that repeatedly receives the image data, a to-be-displayed-image generating section that generates a to-be-displayed image having a resolution higher than a resolution of the downscaled image on the basis of the image data, a substitute image generating section that, on the basis of first image data that is the image data received at a first timing, generates a substitute image that is an image different from the to-be-displayed image generated on the basis of the first image data, that corresponds to second image data that is the image data planned to be received at a second timing that comes after the first timing, and that has a resolution higher than the resolution of the downscaled image, and a display control section that causes either one of the to-be-displayed image generated on the basis of the second image data and the substitute image generated on the basis of the first image data to be displayed according to success or failure of the reception of the second image data. The substitute image generating section starts the generation of the substitute image corresponding to the second image data based on the first image data before the success or failure of the reception of the second image data is confirmed.

In one mode of the present invention, the transmitting section further transmits feature-amount data that is associated with the image data and that represents at least one of a feature amount of the original image and a feature amount that is a parameter used in encoding of the downscaled image, and the transmitting section transmits the feature-amount data to the image display control device, prioritizing the transmission of the feature-amount data over transmission of the image data associated with the feature-amount data.

In addition, an image display control method according to the present invention includes a step of repeatedly receiving image data, a step of generating a to-be-displayed image on the basis of the image data, a step of, on the basis of first image data that is the image data received at a first timing, generating a substitute image that is an image different from the to-be-displayed image generated on the basis of the first image data and that corresponds to second image data that is the image data planned to be received at a second timing that comes after the first timing, and a step of causing either one of the to-be-displayed image generated on the basis of the second image data and the substitute image generated on the basis of the first image data to be displayed according to success or failure of the reception of the second image data. The step of generating the substitute image corresponding to the second image data on the basis of the first image data is started before the success or failure of the reception of the second image data is confirmed.

In addition, a program according to the present invention causes a computer to execute a procedure of repeatedly receiving image data, a procedure of generating a to-be-displayed image on the basis of the image data, a procedure of, on the basis of first image data that is the image data received at a first timing, generating a substitute image that is an image different from the to-be-displayed image generated on the basis of the first image data and that corresponds to second image data that is the image data planned to be received at a second timing that comes after the first timing, and a procedure of causing either one of the to-be-displayed image generated on the basis of the second image data and the substitute image generated on the basis of the first image data to be displayed according to success or failure of the reception of the second image data. The procedure of generating the substitute image corresponding to the second image data on the basis of the first image data is started before the success or failure of the reception of the second image data is confirmed.

DESCRIPTION OF EMBODIMENT

Figure 1:
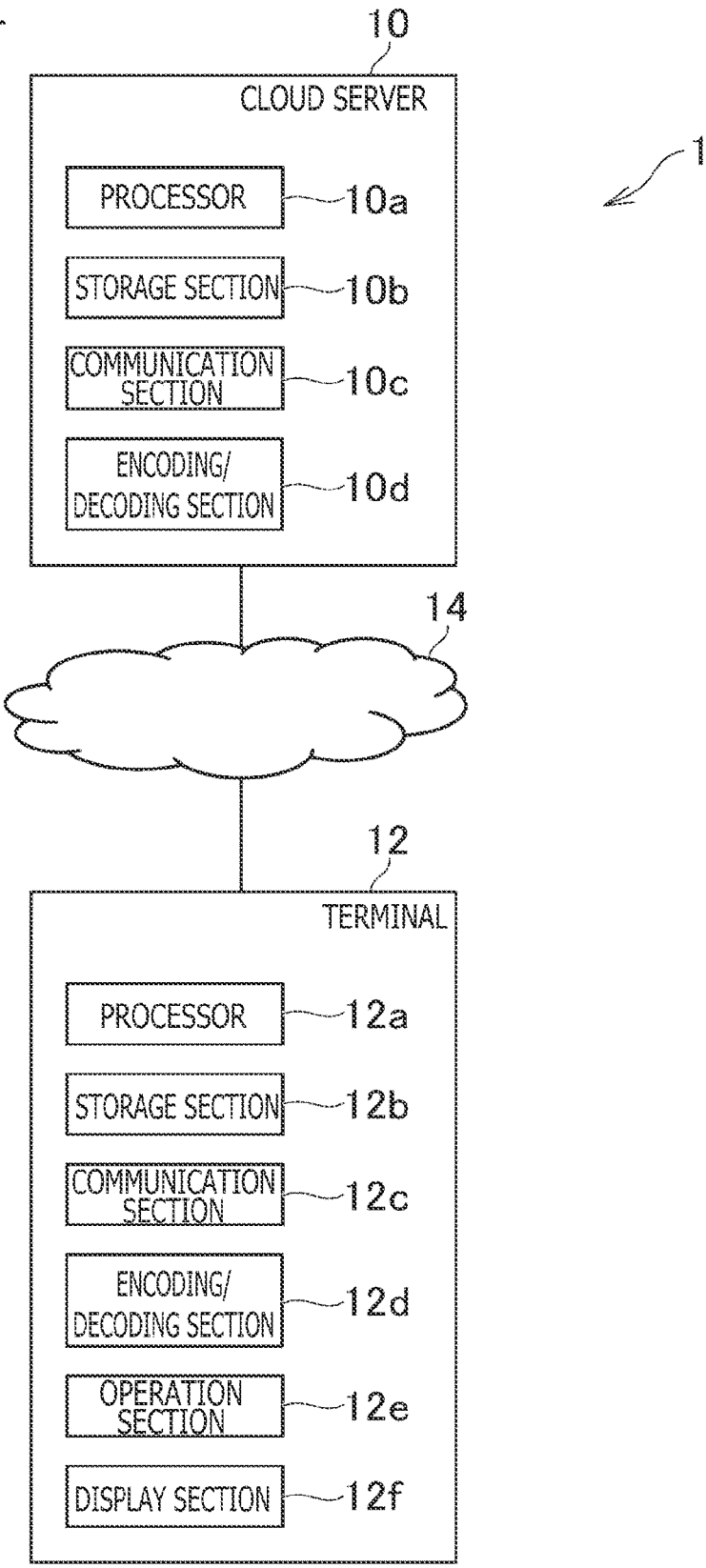
FIG. 1 is a figure depicting one example of an overall configuration of a cloud gaming system according to one embodiment of the present invention.

FIG. 1 is a figure depicting one example of an overall configuration of a cloud gaming system 1 according to one embodiment of the present invention. As depicted in FIG. 1, the cloud gaming system 1 according to the present embodiment includes a cloud server 10 and a terminal 12 both of which are configured with computers as their main constituents. The cloud server 10 and the terminal 12 are connected to a computer network 14 such as the Internet, enabling the cloud server 10 and the terminal 12 to communicate with each other.

The cloud server 10 according to the present embodiment is a server computer that executes a program of a game according to a cloud gaming service, for example. The cloud server 10 distributes moving images representing a situation of plays of the game to the terminal 12 being used by a user who is playing the game.

As depicted in FIG. 1, the cloud server 10 includes a processor 10a, a storage section 10b, a communication section 10c, and an encoding/decoding section 10d, for example.

The processor 10a is a program control device such as a CPU (Central Processing Unit), for example, and executes various types of information processing in accordance with a program stored on the storage section 10b. The processor 10a according to the present embodiment also includes a GPU (Graphics Processing Unit) that draws images in frame buffers on the basis of a graphics command or data supplied from the CPU.

The storage section 10b is a storage element such as a ROM (Read-Only Memory) or a RAM (Random Access Memory), a hard disk drive and the like, for example. A program to be executed by the processor 10a, and the like are stored on the storage section 10b. In addition, a region for frame buffers in which images are drawn by the GPU included in the processor 10a is reserved in the storage section 10b according to the present embodiment.

The communication section 10c is a communication interface for exchanging data with computers like the terminal 12 and the like via the computer network 14, for example.

The encoding/decoding section 10d includes an encoder that encodes images to generate image data, and a decoder that decodes image data to generate images, for example.

The terminal 12 according to the present embodiment is a computer such as a game console, a personal computer, a tablet terminal, or a smartphone used by a user who uses a cloud gaming service, for example.

As depicted in FIG. 1, the terminal 12 includes a processor 12a, a storage section 12b, a communication section 12c, an encoding/decoding section 12d, an operation section 12e, and a display section 12f, for example.

The processor 12a is a program control device such as a CPU, for example, and executes various types of information processing in accordance with a program stored on the storage section 12b. The processor 12a according to the present embodiment also includes a GPU that draws images in frame buffers on the basis of a graphics command or data supplied from the CPU.

The storage section 12b is a storage element such as a ROM or a RAM, a hard disk drive and the like, for example. A program to be executed by the processor 12a, and the like are stored on the storage section 12b. In addition, a region for frame buffers in which images are drawn by the GPU included in the processor 12a is reserved in the storage section 12b according to the present embodiment.

The communication section 12c is a communication interface for exchanging data with computers like the cloud server 10 and the like via the computer network 14, for example.

The encoding/decoding section 12d includes an encoder and a decoder, for example. The encoder encodes an input image to thereby generate image data representing the image. In addition, the decoder decodes input image data, and outputs the image represented by the image data.

The operation section 12e is an operation member for performing operation input to the processor 12a, for example.

The display section 12f is a display device such as a liquid crystal display or an organic EL (Electroluminescence) display, for example.

When operation of the terminal 12 according to the present embodiment related to the game is performed via the operation section 12e, an operation signal representing the operation is transmitted from the terminal 12 to the cloud server 10. Then, game processing according to the operation signal is executed at the cloud server 10. Then, a play image representing a situation of plays of the game influenced by the operation signal is generated. In the present embodiment, the game processing and the generation of play images are executed at a predetermined frame rate (e.g., 60 fps). Note that, in the present embodiment, the game processing, and the generation of play images may be executed at a variable frame rate.

Here, in the present embodiment, not image data representing a play image, but image data representing an image obtained by downscaling the play image is transmitted from the cloud server 10 to the terminal 12. In the following, play images before being downscaled are called original images, and images obtained by downscaling the original images are called downscaled images. Here, original images may be 4K images, and downscaled images may be 2K images.

Then, on the basis of the image data received from the cloud server 10, the terminal 12 generates an image having a resolution higher than the resolution of the downscaled image mentioned above. In the following, images generated in this manner having resolutions higher than the resolutions of downscaled images are called upscaled images. Then, the display section 12f of the terminal 12 displays the upscaled image.

Reception of image data by the terminal 12 is unsuccessful in some cases for reasons that the image data does not arrive at the terminal 12, the image data received by the terminal 12 is partially or entirely corrupt, and so on, due to an overload or connection instability of the server or the network.

Here, in situations as in the cloud gaming service or the like where low latency is required, for example, there is a risk of being unable to receive image data by a timing when the image data should be displayed if retransmission of the image data is started after a failure of reception of the image data is confirmed.

In view of this, in the following manner, the present embodiment makes it possible to reduce the risk of being unable to receive image data by a timing when the image data should be displayed if retransmission of the data is started after a failure of reception of the image data is confirmed.

In the following, functionalities of the cloud gaming system 1, and processes to be executed at the cloud gaming system 1 according to the present embodiment are explained further with a focus on processes for reducing the risk of being unable to receive image data by a timing when the image data should be displayed if retransmission of the data is started after a failure of reception of the image data is confirmed.

Figure 2:
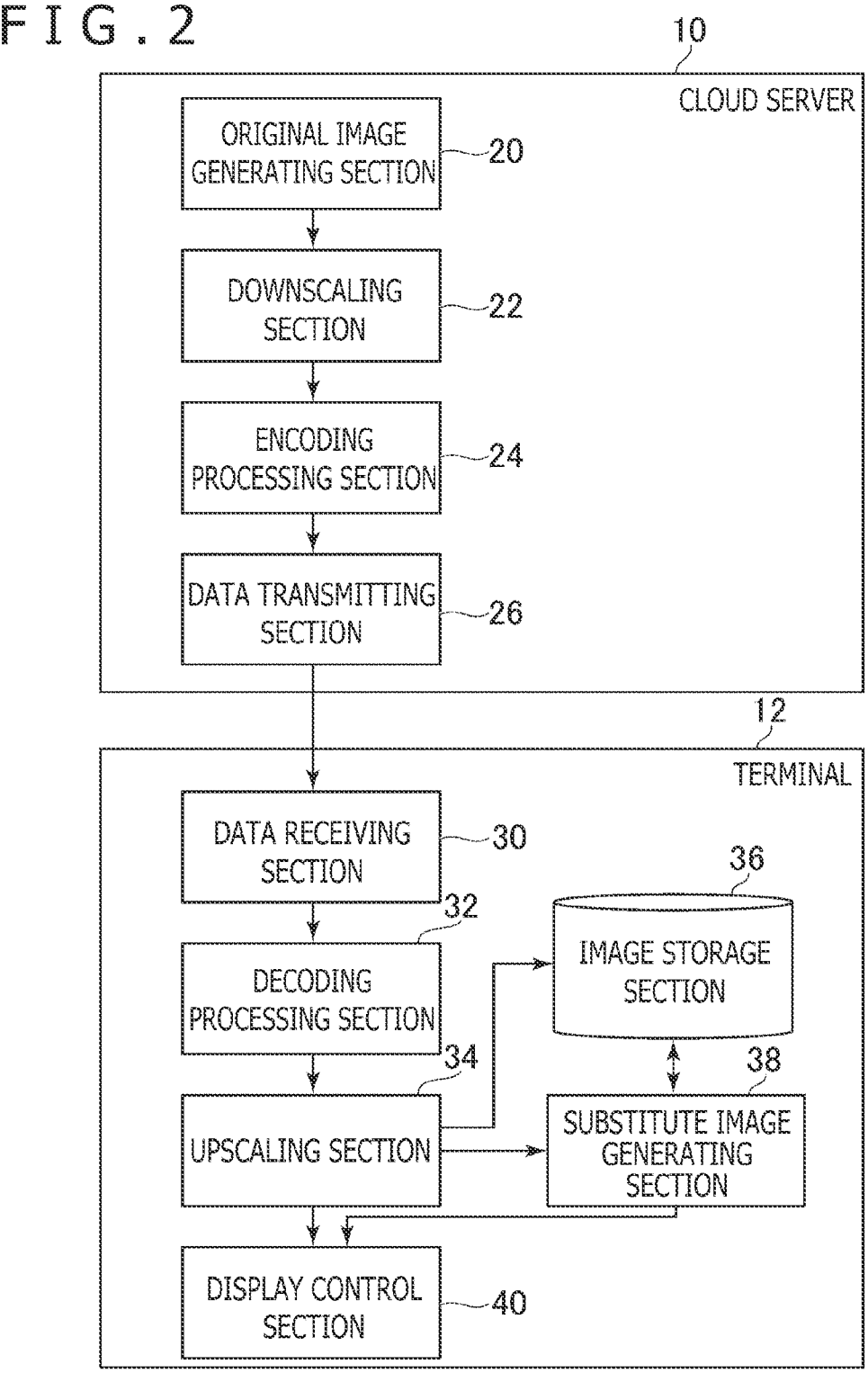
FIG. 2 is a functional block diagram depicting one example of functionalities implemented in the cloud gaming system according to the one embodiment of the present invention.

FIG. 2 is a functional block diagram depicting one example of functionalities implemented in the cloud gaming system 1 according to the present embodiment. Note that not all the functionalities depicted in FIG. 2 need to be implemented in the cloud gaming system 1 according to the present embodiment, and there are no problems if functionalities (e.g., a functionality for game processing based on operation signals and the like, and the like) other than the functionalities depicted in FIG. 2 are implemented in the cloud gaming system 1.

As depicted in FIG. 2, the cloud server 10 according to the present embodiment functionally includes an original image generating section 20, a downscaling section 22, an encoding processing section 24, and a data transmitting section 26, for example.

The original image generating section 20 and the downscaling section 22 are implemented mainly by the processor 10a. The encoding processing section 24 is implemented mainly by the encoding/decoding section 10d. The data transmitting section 26 is implemented mainly by the communication section 10c.

Then, these functionalities are implemented by executing, at the processor 10a, a program installed on the cloud server 10, which is a computer, and including commands corresponding to those functionalities. The program is supplied to the cloud server 10 via a computer-readable information storage medium such as an optical disc, a magnetic disc, a magnetic tape, a magneto-optical disc, or a flash memory, or via the Internet or the like, for example.

In addition, as depicted in FIG. 2, the terminal 12 according to the present embodiment functionally includes a data receiving section 30, a decoding processing section 32, an upscaling section 34, an image storage section 36, a substitute image generating section 38, and a display control section 40, for example. The data receiving section 30 is implemented mainly by the communication section 12c. The decoding processing section 32 is implemented mainly by the encoding/decoding section 12d. The upscaling section 34 and the substitute image generating section 38 are implemented mainly by the processor 12a and the storage section 12b. The image storage section 36 is implemented mainly by the storage section 12b. The display control section 40 is implemented mainly by the processor 12a and the display section 12f. In the present embodiment, the terminal 12 plays a role of an image display control device that performs image display control.

Then, these functionalities are implemented by executing, at the processor 12a, a program installed on the terminal 12, which is a computer, and including commands corresponding to those functionalities. The program is supplied to the terminal 12 via a computer-readable information storage medium such as an optical disc, a magnetic disc, a magnetic tape, a magneto-optical disc, or a flash memory, or via the Internet or the like, for example.

In the present embodiment, for example, the original image generating section 20 generates the original image mentioned above. As mentioned above, the original image is a play image representing a situation of plays of the game, for example.

In the present embodiment, for example, the downscaling section 22 generates the downscaled image obtained by downscaling the original image generated by the original image generating section 20.

In the present embodiment, for example, the encoding processing section 24 generates the image data representing the downscaled image obtained by downscaling the original image. For example, by encoding the downscaled image generated by the downscaling section 22, the encoding processing section 24 generates the image data representing the downscaled image. Here, the downscaled image may be compressed by encoding the downscaled image, and image data with a size smaller than the size of the downscaled image may be generated. Examples of an encoding method to be used in encoding of the downscaled image include MPEG (Moving Picture Experts Group)-4 AVC (Advanced Video Coding)/H.264/, HEVC (High Efficiency Video Coding)/H265, and the like.

The data transmitting section 26 transmits the image data generated by the encoding processing section 24 to the terminal 12.

In the present embodiment, for example, the data receiving section 30 receives the image data mentioned above transmitted from the cloud server 10.

In the present embodiment, the transmission of the image data by the data transmitting section 26, and the reception of the image data by the data receiving section 30 are executed repeatedly at predetermined time intervals, for example.

In the present embodiment, for example, the decoding processing section 32 generates an image by decoding the image data received by the data receiving section 30. In the following, images generated in this manner are called decoded images. In the present embodiment, the decoded image is an image (e.g., a 2K image) having a resolution which is the same as the resolution of the downscaled image. In a case where the encoding method used for the downscaled image is an irreversible encoding method, typically, the decoded image is not completely the same as the downscaled image.

In the present embodiment, for example, on the basis of the image data received by the data receiving section 30, the upscaling section 34 generates a to-be-displayed image to be displayed on the display section 12f. Here, for example, an upscaled image having a resolution higher than the resolution of the downscaled image generated by the downscaling section 22 is generated as the to-be-displayed image. The upscaled image may be an image (e.g., a 4K image) having a resolution which is the same as the resolution of the original image. Details of an upscaled image generation process are mentioned below.

In the present embodiment, for example, the image storage section 36 stores images generated at the terminal 12. Here, the image storage section 36 may store upscaled images generated by the upscaling section 34. In addition, the image storage section 36 may store substitute images mentioned below generated by the substitute image generating section 38.

In the present embodiment, for example, on the basis of first image data which is image data received at a first timing, the substitute image generating section 38 generates a substitute image corresponding to second image data which is image data planned to be received at a second timing that comes after the first timing. Here, the substitute image generated on the basis of the first image data is an image different from a to-be-displayed image generated on the basis of the first image data. Then, in the present embodiment, for example, the substitute image generating section 38 starts the generation of the substitute image corresponding to the second image data based on the first image data before the success or failure of the reception of the second image data is confirmed. Here, for example, on the basis of the received first image data, the substitute image corresponding to the second image data planned to be received next to the first image data may be generated. The substitute image may be an image (e.g., an image (e.g., a 4K image) having a resolution which is the same as the resolution of an upscaled image) having a resolution higher than the resolution of a downscaled image. In addition, in a case where part of the second image data is received, the substitute image generating section 38 may generate the substitute image further on the basis of the part. Details of a substitute image generation process are mentioned below.

In the present embodiment, for example, according to success or failure of reception of the second image data, the display control section 40 causes either one of the to-be-displayed image generated on the basis of the second image data and the substitute image generated on the basis of the first image data mentioned above to be displayed. Here, for example, the display control section 40 causes either one of the upscaled image and the substitute image to be displayed on the display section 12f of the terminal 12.

Figure 3:
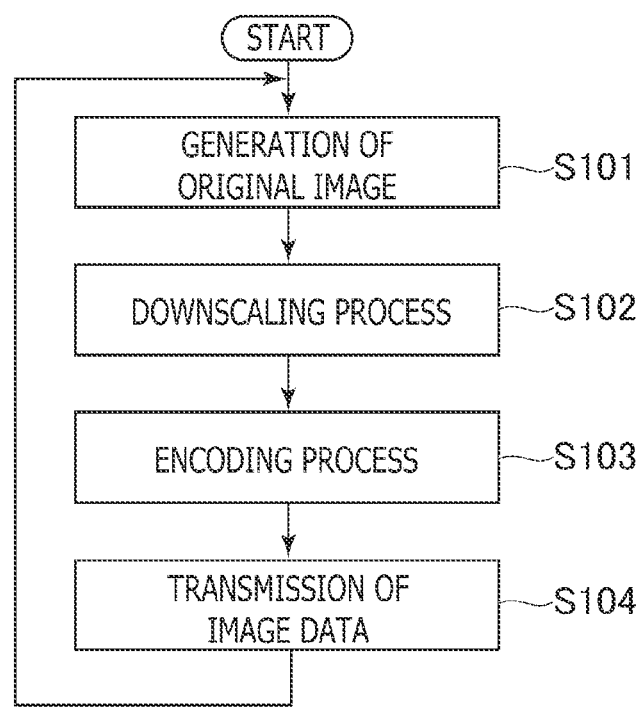
FIG. 3 is a flowchart depicting one example of a flow of processes performed in a cloud server according to the one embodiment of the present invention.

Here, one example of a flow of an image data generation process and transmission process executed at the cloud server 10 according to the present embodiment is explained with reference to a flowchart illustrated in FIG. 3. Processes depicted as S101 to S104 depicted in FIG. 3 are executed repeatedly at a predetermined frame rate (e.g., at 60 fps). Note that the processes depicted as S101 to S104 may be executed repeatedly at a variable frame rate.

First, the original image generating section 20 generates an original image of the frame (S101). Here, as mentioned above, an original image of the frame representing a situation of plays of the game influenced by an operation signal received from the terminal 12 may be generated.

Then, the downscaling section 22 executes a downscaling process on the original image generated in the process depicted as S101 to thereby generate a downscaled image (S102).

Then, the encoding processing section 24 executes an encoding process on the downscaled image generated in the process depicted as S102 to thereby generate image data (S103).

Then, the data transmitting section 26 transmits the image data generated in the process depicted as S103 to the terminal 12 (S104), and the process returns to the process depicted as S101.

Figure 4:
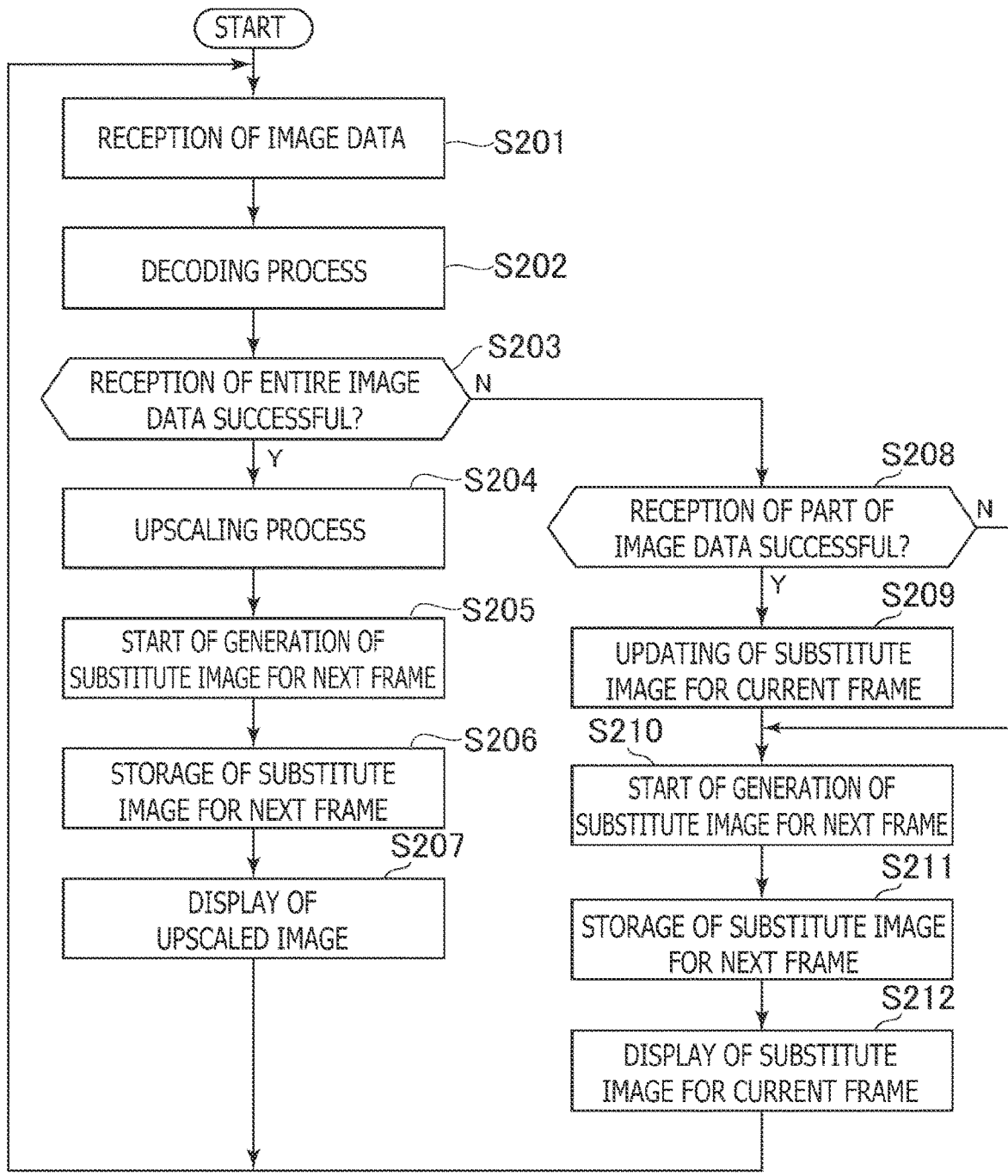
FIG. 4 is a flowchart depicting one example of a flow of processes performed at a terminal according to the one embodiment of the present invention.

Next, one example of a flow of a control process of displaying an upscaled image or a substitute image executed at the terminal 12 according to the present embodiment is explained with reference to a flowchart illustrated in FIG. 4. Processes depicted as S201 to S212 depicted in FIG. 4 are executed repeatedly at a predetermined frame rate (e.g., at 60 fps). Note that the processes depicted as S201 to S212 may be executed repeatedly at a variable frame rate.

First, the data receiving section 30 receives the image data transmitted from the cloud server 10 in the process depicted as S104 (S201).

Then, the decoding processing section 32 executes a decoding process on the image data received in the process depicted as S201 to thereby generate a decoded image (S202).

Then, the upscaling section 34 confirms whether or not the reception of the entire image data of the frame is successful (S203). In a case where the image data does not arrive at the terminal 12 or in a case where the entire image data received by the terminal 12 is corrupt, it is confirmed in the process depicted as S203 that the reception of the entire image data of the frame is unsuccessful. In addition, in a case where the entire decoded image is not generated in the process depicted as S202, it may be confirmed in the process depicted as S203 that the reception of the entire image data of the frame is unsuccessful. In addition, here, in a case where the reception of the entire image data is unsuccessful, the data receiving section 30 may give the upscaling section 34 a notification to that effect. Then, when the upscaling section 34 receives the notification, it may be confirmed in the process depicted as S203 that the reception of the entire image data of the frame is unsuccessful.

It is supposed here that it is confirmed in the process depicted as S203 that the reception of the entire image data of the frame is successful (S203: Y). In this case, the upscaling section 34 executes an upscaling process on the decoded image generated in the process depicted as S202 to thereby generate an upscaled image (S204). Here, an upscaling process using an upscaling model 50 illustrated in FIG. 5 which is a machine learning model having been obtained by learning is executed. Here, the upscaling model 50 may be one that uses a deep learning technology. The upscaling model 50 may include information regarding the coupling topology of each node included in a neural network, and information regarding parameters of coupling strengths.

In the process depicted as S204, for example, the decoded image of the frame generated in the process depicted as S202 is input to the upscaling model 50. Then, an upscaled image according to the input is output from the upscaling model 50. Here, the upscaling model 50 is included in the upscaling section 34, for example.

Figure 5:
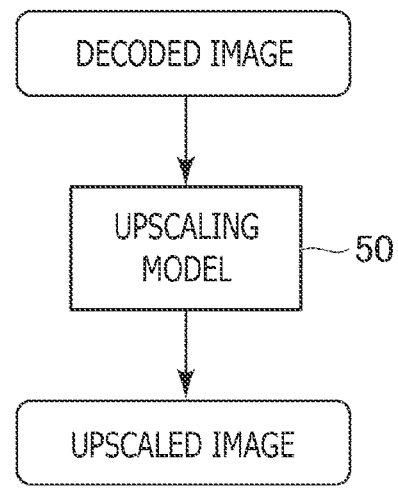
FIG. 5 is a figure schematically depicting one example of an upscaling model.
Figure 6:
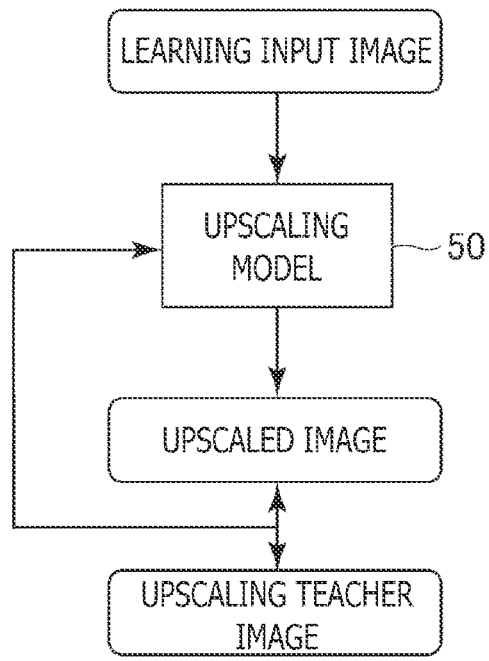
FIG. 6 is a figure schematically depicting one example of learning of the upscaling model depicted in FIG. 5.

FIG. 6 is a figure schematically depicting one example of the learning of the upscaling model 50 depicted in FIG. 5. Learning of the upscaling model 50 is executed by using a plurality of pieces of learning data, for example. The learning data includes learning input data including learning input images, and upscaling teacher images which are teacher data to be compared with upscaled images which are outputs of the upscaling model 50, for example.

For example, a learning input image which is a low-resolution image (e.g., a 2K image) may be generated by executing the downscaling process mentioned above, the encoding process mentioned above, and the decoding process mentioned above on a high-resolution image (e.g., a 4K image).

Then, learning data including the learning input image mentioned above, and an upscaling teacher image which is the high-resolution image mentioned above may be generated. Then, the learning of the upscaling model 50 may be executed by supervised learning using a plurality of pieces of learning data generated in this manner on the basis of many high-resolution images. For example, upscaled images which are outputs produced when the learning input data included in the learning data is input to the upscaling model 50, and upscaling teacher images included in the learning data may be compared. Then, the learning of the upscaling model 50 may be executed by updating parameters of the upscaling model 50 by error backpropagation (backpropagation) on the basis of results of the comparison.

Note that the learning of the upscaling model 50 is not limited to the method mentioned above. For example, the learning of the upscaling model 50 may be executed by unsupervised learning, reinforcement learning or the like.

When the process depicted as S204 ends, the substitute image generating section 38 starts generation of a substitute image for the next frame which is an image generated on the basis of the image data received in the process depicted as S201, and is based on a basic image used for generation of a substitute image (S205). Here, for example, the upscaling section 34 may store the upscaled image generated in the process depicted as S204 on the image storage section 36 as a basic image. In addition, for example, the upscaling section 34 may store the decoded image generated in the process depicted as S202 on the image storage section 36 as a basic image. Then, the substitute image generating section 38 may start the generation of the substitute image based on the basic image stored on the image storage section 36.

Figure 7:
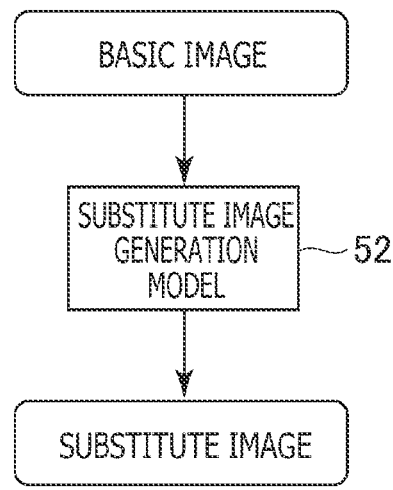
FIG. 7 is a figure schematically depicting one example of a substitute image generation model.

Here, execution of a substitute image generation process using a substitute image generation model 52 illustrated in FIG. 7 which is a machine learning model having been obtained by learning is started. Here, the substitute image generation model 52 may be one that uses a deep learning technology. The substitute image generation model 52 may include information regarding the coupling topology of each node included in a neural network, and information regarding parameters of coupling strengths.

In the process depicted as S205, for example, the basic image of the frame stored on the image storage section 36 is input to the substitute image generation model 52. Then, a substitute image according to the input is output from the substitute image generation model 52. Here, the substitute image generation model 52 is included in the substitute image generating section 38, for example.

Figure 8:
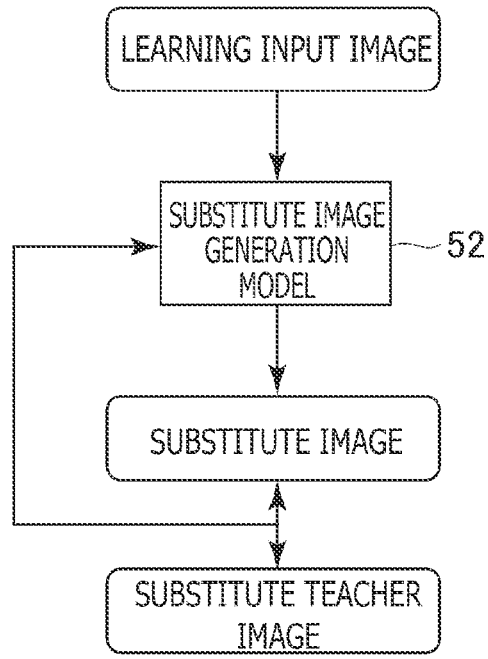
FIG. 8 is a figure schematically depicting one example of learning of the substitute image generation model depicted in FIG. 7.

FIG. 8 is a figure schematically depicting one example of the learning of the substitute image generation model 52 depicted in FIG. 7. Learning of the substitute image generation model 52 is executed by using a plurality of pieces of learning data, for example. The learning data includes learning input data including learning input images, and substitute teacher images which are teacher data to be compared with substitute images which are outputs of the substitute image generation model 52, for example.

For example, it is supposed here that the basic image is a decoded image. In this case, the downscaling process mentioned above, the encoding process mentioned above, and the decoding process mentioned above may be executed on a high-resolution image (e.g., a 4K image) which is a frame image included in a certain moving image. Then, a learning input image which is a low-resolution image (e.g., a 2K image) may be generated thereby. In addition, for example, it is supposed here that the basic image is an upscaled image. In this case, the downscaling process mentioned above, the encoding process mentioned above, the decoding process mentioned above, and the upscaling process mentioned above may be executed on a high-resolution image (e.g., a 4K image) which is a frame image included in a moving image. Then, a learning input image which is a high-resolution image may be generated thereby.

Then, learning data including learning input data including the learning input image mentioned above, and a substitute teacher image which is a frame image of a frame next to the frame image corresponding to the learning input image in the certain moving image mentioned above may be generated. Then, the learning of the substitute image generation model 52 may be executed by supervised learning using a plurality of pieces of learning data generated in this manner on the basis of many moving images and many frame images. For example, substitute images which are outputs produced when the learning input data included in the learning data is input to the substitute image generation model 52, and substitute teacher images included in the learning data may be compared. Then, the learning of the substitute image generation model 52 may be executed by updating parameters of the substitute image generation model 52 by error backpropagation (backpropagation) on the basis of results of the comparison.

Note that the learning of the substitute image generation model 52 is not limited to the method mentioned above. For example, the learning of the substitute image generation model 52 may be executed by unsupervised learning, reinforcement learning or the like.

Then, the substitute image generating section 38 stores, on the image storage section 36, the substitute image for the next frame, the generation of which has started in the process depicted as S205, and has ended (S206).

Then, the display control section 40 causes the upscaled image generated in the process depicted as S204 to be displayed on the display section 12f (S207), and the process returns to the process depicted as S201.

It is supposed here that it is confirmed in the process depicted as S203 that the reception of the entire image data of the frame is unsuccessful (S203: N). In this case, the substitute image generating section 38 confirms whether or not the reception of part of the image data of the frame is successful (S208). In a case where part of the image data received by the terminal 12 is corrupt, it is confirmed in the process depicted as S208 that the reception of part of the image data of the frame is unsuccessful. In addition, in a case where part of the decoded image is not generated in the process depicted as S202, it may be confirmed in the process depicted as S208 that the reception of part of the image data of the frame is unsuccessful. In addition, here, in a case where the reception of part of the image data is unsuccessful, the data receiving section 30 may give the substitute image generating section 38 a notification to that effect. Then, when the substitute image generating section 38 receives the notification, it may be confirmed in the process depicted as S208 that the reception of part of the image data of the frame is unsuccessful.

It is supposed here that it is confirmed in the process depicted as S208 that the reception of part of the image data of the frame is successful (S208: Y). In this case, the substitute image generating section 38 updates a substitute image for the frame on the basis of the received part of the image data of the frame (S209). In the process depicted as S209, the received part of the image data of the frame is reflected in the substitute image for the frame. Here, a process of updating a substitute image by using a substitute image updating model 54 illustrated in FIG. 9 which is a machine learning model having been obtained by learning is executed. Here, the substitute image updating model 54 may be one that uses a deep learning technology. The substitute image updating model 54 may include information regarding the coupling topology of each node included in a neural network, and information regarding parameters of coupling strengths.

In the process depicted as S208, for example, a first substitute image stored in the process depicted as S206 for the previous frame, and partial image data which is the received part of the image data of the current frame are input to the substitute image updating model 54. Then, a second substitute image according to the inputs is output from the substitute image updating model 54. In this way, the first substitute image stored in the process depicted as S206 for the previous frame is updated to the second substitute image. Here, the substitute image updating model 54 is included in the substitute image generating section 38, for example.

Figure 9:
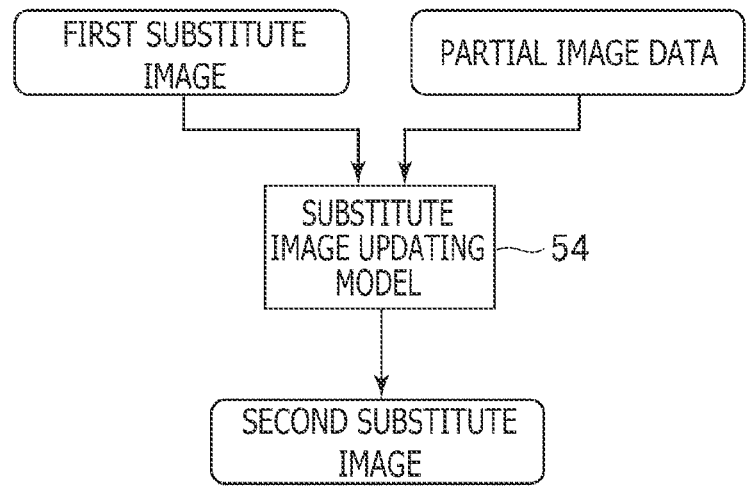
FIG. 9 is a figure schematically depicting one example of a substitute image updating model.
Figure 10:
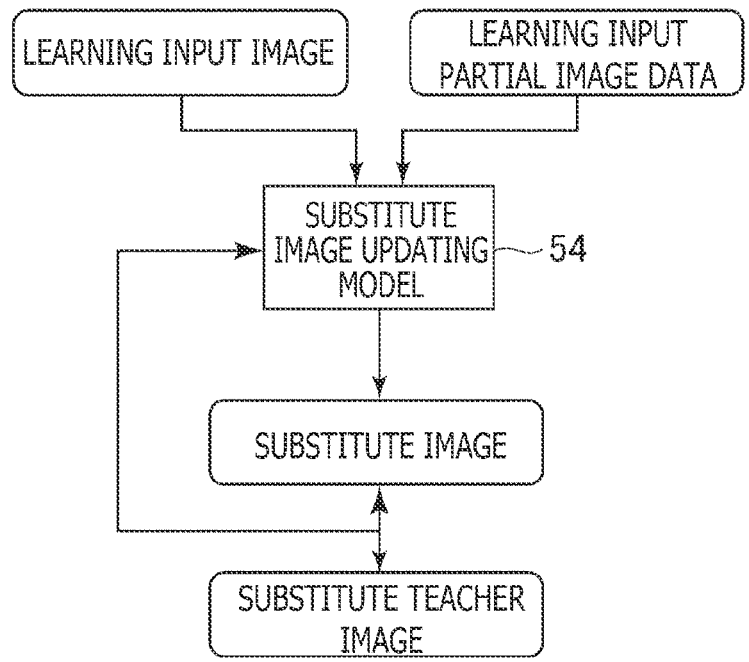
FIG. 10 is a figure schematically depicting one example of learning of the substitute image updating model depicted in FIG. 9.

FIG. 10 is a figure schematically depicting one example of the learning of the substitute image updating model 54 depicted in FIG. 9. Learning of the substitute image updating model 54 is executed by using a plurality of pieces of learning data, for example. The learning data includes learning input data including learning input images and learning input partial image data, and substitute teacher images which are teacher data to be compared with substitute images which are outputs of the substitute image updating model 54, for example.

For example, it is supposed here that the basic image is a decoded image. In this case, the downscaling process mentioned above, the encoding process mentioned above, and the decoding process mentioned above may be executed on a high-resolution image (e.g., a 4K image) which is a frame image included in a certain moving image. Then, a learning input image which is a low-resolution image (e.g., a 2K image) may be generated thereby. In addition, for example, it is supposed here that the basic image is an upscaled image. In this case, the downscaling process mentioned above, the encoding process mentioned above, the decoding process mentioned above, and the upscaling process mentioned above may be executed on a high-resolution image (e.g., a 4K image) which is a frame image included in a moving image. Then, a learning input image which is a high-resolution image may be generated thereby.

Then, learning input partial image data which is part of image data generated by executing the downscaling process mentioned above, and the encoding process mentioned above on a frame image of a frame next to the frame image corresponding to the learning input image in the certain moving image mentioned above may be generated.

Then, learning data including learning input data including the learning input image mentioned above and the learning input partial image data mentioned above, and a substitute teacher image which is a frame image of a frame next to the frame image corresponding to the learning input image in the certain moving image mentioned above may be generated. Then, the learning of the substitute image updating model 54 may be executed by supervised learning using a plurality of pieces of learning data generated in this manner on the basis of many moving images and many frame images. For example, substitute images which are outputs produced when the learning input data included in the learning data is input to the substitute image updating model 54, and substitute teacher images included in the learning data may be compared. Then, the learning of the substitute image updating model 54 may be executed by updating parameters of the substitute image updating model 54 by error backpropagation (backpropagation) on the basis of results of the comparison.

Note that the learning of the substitute image updating model 54 is not limited to the method mentioned above. For example, the learning of the substitute image updating model 54 may be executed by unsupervised learning, reinforcement learning or the like.

In a case where the process depicted as S209 has ended or in a case where it is confirmed in the process depicted as S208 that the reception of part of the image data of the frame is unsuccessful (S208: N), the substitute image generating section 38 starts generation of a substitute image for the next frame (S210). Here, in a case where the process depicted as S209 has ended, the substitute image generating section 38 may store, on the image storage section 36 and as a basic image, the substitute image updated in the process depicted as S209. Then, the substitute image generating section 38 may start the generation of the substitute image for the next frame on the basis of the basic image. In addition, in a case where the reception of part of the image data of the frame is unsuccessful in the process depicted as S208, a substitute image stored in the process depicted as S206 for the previous frame may be stored on the image storage section 36 as a basic image. Then, the substitute image generating section 38 may start the generation of the substitute image for the next frame on the basis of the basic image.

Here, execution of a substitute image generation process using the substitute image generation model 52 illustrated in FIG. 7 which is the machine learning model having been obtained by learning is started. Here, the substitute image generation model 52 may be one that uses a deep learning technology.

Then, the substitute image generating section 38 stores, on the image storage section 36, the substitute image for the next frame, the generation of which has started in the process depicted as S210, and has ended (S211).

Then, the display control section 40 causes the substitute image for the frame to be displayed on the display section 12f (S212), and the process returns to the process depicted as S201.

In this process example, it is supposed here that it is confirmed in an n-th frame that reception of entire image data of the n-th frame is successful (S203: Y). In this case, an upscaled image generated on the basis of the image data received for the n-th frame is displayed (S207). In addition, in this case, in the n-th frame, a substitute image for an (n+1)-th frame is generated on the basis of the upscaled image (S205, S206).

It is supposed here that it is confirmed in the n-th frame that the reception of the entire image data of the n-th frame is unsuccessful, and reception of part of the image data of the n-th frame is successful (S203: N, S208: Y). In this case, in the n-th frame, a substitute image for the n-th frame generated in an (n−1)-th frame is updated (S209). Then, the substitute image for the n-th frame having been updated is displayed (S212). In addition, in this case, in the n-th frame, a substitute image for the (n+1)-th frame is generated on the basis of the substitute image for the n-th frame having been updated (S210, S211).

It is supposed here that it is confirmed in the n-th frame that the reception of the entire image data of the n-th frame is unsuccessful, and reception of part of the image data of the n-th frame is unsuccessful (S203: N, S208: N). In this case, in the n-th frame, the substitute image for the n-th frame generated in the (n−1)-th frame is displayed (S212). In addition, in this case, in the n-th frame, a substitute image for the (n+1)-th frame is generated on the basis of the substitute image for the n-th frame generated in the (n−1)-th frame (S210, S211).

In addition, in this process example, the display of the upscaled image, or the display of the substitute image for the frame may be executed without waiting for the start of generation of a substitute image for the next frame, and the end of storage of the substitute image for the next frame.

In addition, the substitute image updating model 54 may output a determination value representing whether or not an imaginary image different from an image that actually should be displayed is to be output as a second substitute image. For example, in a case where an imaginary image different from an image that actually should be displayed is output as a second substitute image, the determination value "1" may be output, and in a case where an image that actually should be displayed is output as a second substitute image, the determination value "0" may be output. In this case, the learning of the substitute image updating model 54 may be executed by using teacher data including certain learning determination values according to learning input data that are to be compared with determination values output by the substitute image updating model 54 according to input of the learning input data. In this case, the determination value may be output together from the substitute image updating model 54 in the process depicted as S209.

Then, on the basis of the determination value, in the process depicted as S212, the display control section 40 may control whether or not to cause a substitute image generated in the current frame to be displayed on the display section 12f. For example, in a case where the determination value "1" is output from the substitute image updating model 54, the display control section 40 may perform control such that the substitute image is not displayed. In addition, in a case where the determination value "0" is output from the substitute image updating model 54, the display control section 40 may perform control such that the substitute image is displayed.

In addition, similarly, the substitute image generation model 52 may output a determination value representing whether or not an imaginary image different from an image that actually should be displayed is to be output as a substitute image. For example, in a case where an imaginary image different from an image that actually should be displayed is output as a substitute image, the determination value "1" may be output, and in a case where an image that actually should be displayed is output as a substitute image, the determination value "0" may be output. In this case, the learning of the substitute image generation model 52 may be executed by using teacher data including certain learning determination values according to learning input data that are to be compared with determination values output by the substitute image generation model 52 according to input of the learning input data. In this case, the determination value may be output together from the substitute image generation model 52 in the processes depicted as S205 or S210.

Then, on the basis of the determination value, in the process depicted as S212 for the next frame, the display control section 40 may control whether or not to cause a substitute image generated in the current frame to be displayed on the display section 12f. For example, in a case where the determination value "1" is output from the substitute image generation model 52, the display control section 40 may perform control such that the substitute image is not displayed. In addition, in a case where the determination value "0" is output from the substitute image generation model 52, the display control section 40 may perform control such that the substitute image is displayed.

Here, for example, in a case where the determination value "1" is output from either the substitute image generation model 52 or the substitute image updating model 54, the display control section 40 may perform control such that the substitute image is not displayed.

Figure 11:
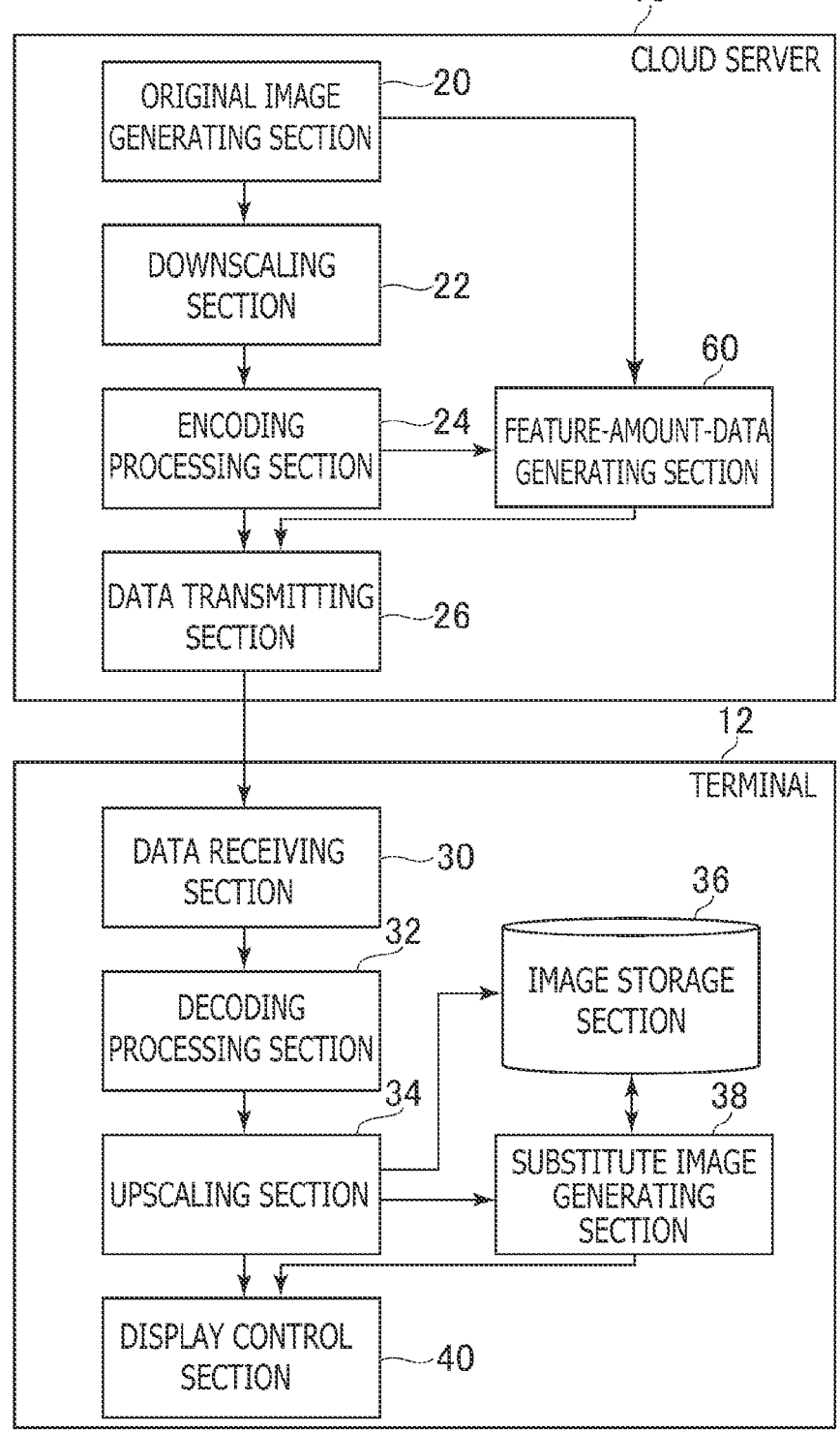
FIG. 11 is a functional block diagram depicting another example of the functionalities implemented in the cloud gaming system according to the one embodiment of the present invention.

FIG. 11 is a functional block diagram depicting another example of the functionalities implemented in the cloud gaming system 1 according to the present embodiment. Note that not all the functionalities depicted in FIG. 11 need to be implemented in the cloud gaming system 1 according to the present embodiment, and there are no problems if functionalities other than the functionalities depicted in FIG. 11 are implemented in the cloud gaming system 1.

In the example in FIG. 11, similarly to the example in FIG. 2, the cloud server 10 functionally includes the original image generating section 20, the downscaling section 22, the encoding processing section 24, and the data transmitting section 26, for example. Then, in the example in FIG. 11, the cloud server 10 further includes a feature-amount-data generating section 60. The feature-amount-data generating section 60 is implemented mainly by the processor 10a and the storage section 10b, for example.

These functionalities are implemented by executing, at the processor 10a, a program installed on the cloud server 10, which is a computer, and including commands corresponding to those functionalities. The program is supplied to the cloud server 10 via a computer-readable information storage medium such as an optical disc, a magnetic disc, a magnetic tape, a magneto-optical disc, or a flash memory, or via the Internet or the like, for example.

In addition, in the example in FIG. 11, similarly to the example in FIG. 2, the terminal 12 functionally includes the data receiving section 30, the decoding processing section 32, the upscaling section 34, the image storage section 36, the substitute image generating section 38, and the display control section 40, for example.

These functionalities are implemented by executing, at the processor 12a, a program installed on the terminal 12, which is a computer, and including commands corresponding to those functionalities. The program is supplied to the terminal 12 via a computer-readable information storage medium such as an optical disc, a magnetic disc, a magnetic tape, a magneto-optical disc, or a flash memory, or via the Internet or the like, for example.

The functionalities of the original image generating section 20, the downscaling section 22, the encoding processing section 24, the decoding processing section 32, and the display control section 40 are similar to the contents explained with reference to FIG. 2, and so explanations thereof are omitted.

In the present embodiment, for example, the feature-amount-data generating section 60 generates feature-amount data representing at least one of a feature amount of an original image generated by the original image generating section 20, and a feature amount which is a parameter used in encoding of a downscaled image. The feature-amount data is data that cannot be identified only from image data representing the downscaled image.

Here, the feature-amount data may include data representing at least one of feature points of the original image, edge strengths, a depth of each pixel included in the original image, a texture type of the original image, an optical flow, and information representing in which directions and at what speeds rectangular regions in the image are moving. For example, the feature-amount-data generating section 60 may extract a feature amount of the original image, and generate feature-amount data representing the extracted feature amount. For example, the feature-amount data may include data representing a texture type of the original image (e.g., data representing a position of an edge region, a flat region, a high density region, a detail region, or a crowd region). In addition, the feature-amount data may include data representing positions of Harris corner feature points, or edge strengths in the original image. In addition, the feature-amount data may include data represent an optical flow in the original image. In addition, the feature-amount data may include depth data representing the depth of each pixel included in the original image.

In addition, the feature-amount-data generating section 60 may execute an object recognition process on the original image. Then, data representing an object represented by the original image identified by the object recognition process may be included in the feature-amount data.

In addition, the feature-amount-data generating section 60 may generate feature-amount data representing a feature amount which is a parameter used in encoding by the encoding processing section 24. The feature-amount data may include data of Motion Estimation (ME) information representing in which directions and at what speeds rectangular regions in the image are moving, for example. In addition, the feature-amount data may include data of CU unit allocation information representing, for each size of CU units, positions to which CU units with the sizes are allocated. In addition, the feature-amount data may include data representing a Resion of Interesting (ROI) region which is a region to which a high bit rate is allocated for obtaining high image quality. In addition, the feature-amount data may include data representing the value of a quantization parameter. In addition, the feature-amount data may include data representing whether or not the scene has switched, and data representing whether or not the current frame is a key frame (I frame).

In addition, for example, the feature-amount-data generating section 60 may generate feature-amount data representing a feature amount of the original image, and a feature amount which is a parameter used in encoding by the encoding processing section 24. In addition, for example, feature-amount data including data generated on the basis of data representing a feature amount of the original image, and data representing a feature amount which is a parameter used in encoding by the encoding processing section 24 may be generated. For example, the feature-amount-data generating section 60 may decide whether or not it is necessary to execute super-resolution processing on the basis of data representing a feature amount of the original image, and data representing a feature amount which is a parameter used in encoding by the encoding processing section 24. Then, the feature-amount-data generating section 60 may generate feature-amount data including data representing whether or not it is necessary to execute the super-resolution processing.

Then, in the example in FIG. 11, the data transmitting section 26 transmits image data, and feature-amount data corresponding to the image data in association with each other to the terminal 12. Here, for example, image data generated on the basis of a downscaled image obtained by downscaling an original image, and feature-amount data generated on the basis of the original image may be transmitted to the terminal 12 in a state in which the image data and the feature-amount data are associated with each other. In addition, the feature-amount data may be transmitted from the cloud server 10 to the terminal 12 as sideband information of the image data.

Here, in order to reduce the amount of communication between the cloud server 10 and the terminal 12, the size of the feature-amount data generated by the feature-amount-data generating section 60 is desirably as small as possible.

Then, in the example in FIG. 11, the data receiving section 30 receives the image data mentioned above, and the feature-amount data mentioned above associated with the image data that are transmitted from the cloud server 10.

Then, in the example in FIG. 11, the upscaling section 34 generates a to-be-displayed image on the basis of the image data, and the feature-amount data associated with the image data that are received by the data receiving section 30. Here, for example, an upscaled image having a resolution higher than the resolution of the downscaled image generated by the downscaling section 22 is generated.

Then, in the example in FIG. 11, the substitute image generating section 38 generates a substitute image corresponding to the second image data mentioned above on the basis of the first image data mentioned above, and feature-amount data associated with the first image data. Here, in a case where the second image data, and part of feature-amount data associated with the second image data are received, the substitute image generating section 38 may generate the substitute image further on the basis of the part.

Figure 12:
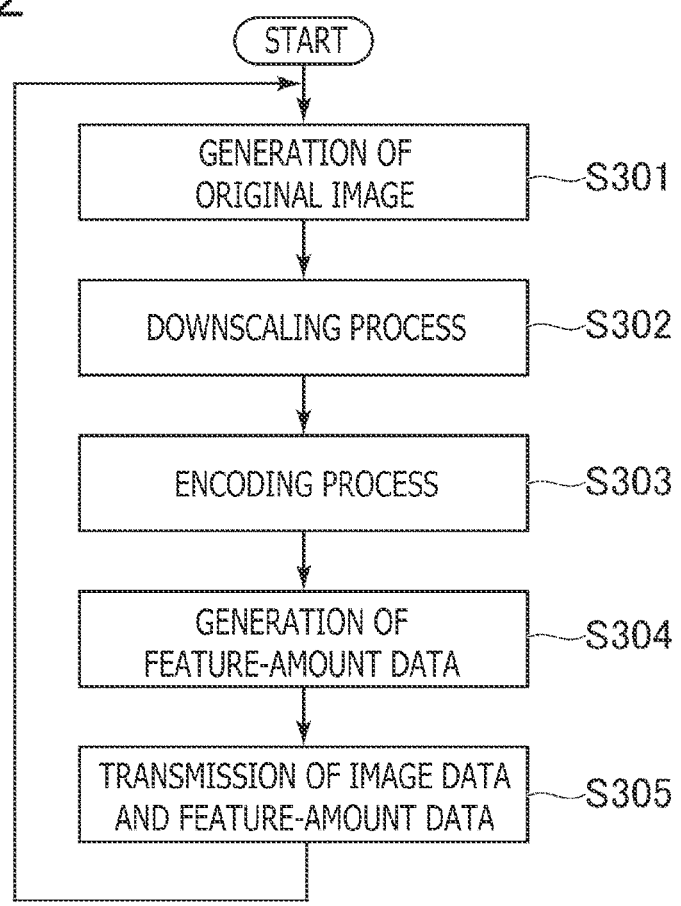
FIG. 12 is a flowchart depicting another example of the flow of processes performed in the cloud server according to the one embodiment of the present invention.

Here, one example of a flow of an image data generation process and transmission process executed at the cloud server 10 illustrated in FIG. 11 is explained with reference to a flowchart illustrated in FIG. 12. Processes depicted as S301 to S305 depicted in FIG. 12 are executed repeatedly at a predetermined frame rate (e.g., at 60 fps). Note that the processes depicted as S301 to S305 may be executed repeatedly at a variable frame rate.

The processes depicted as S301 to S303 are similar to the processes depicted as S101 to S103, and so explanations thereof are omitted.

When the process depicted as S303 ends, the feature-amount-data generating section 60 generates feature-amount data (S304). In the process depicted as S304, for example, the feature-amount-data generating section 60 may generate feature-amount data representing a feature amount of the original image generated in the process depicted as S301. Here, for example, feature-amount data representing a feature amount extracted from the original image generated in the process depicted as S301 may be generated. In addition, for example, the feature-amount-data generating section 60 may generate feature-amount data representing a feature amount which is a parameter used in the encoding depicted in S303. In addition, for example, the feature-amount-data generating section 60 may generate feature-amount data representing both a feature amount extracted from the original image generated in the process depicted as S301, and a feature amount which is a parameter used in the encoding depicted in S303.

Then, the data transmitting section 26 transmits, to the terminal 12, the image data generated in the process depicted as S303, and the feature-amount data associated with the image data and generated in the process depicted as S304 (S305), and the process returns to the process depicted as S301.

In this process example, the data transmitting section 26 may transmit the feature-amount data to the terminal 12, prioritizing the transmission over the transmission of the image data. For example, a technology of QoS (Quality of Service) or priority control may be used such that the feature-amount data is transmitted to the terminal 12, prioritizing the transmission of the feature-amount data over the transmission of the image data.

Figure 13:
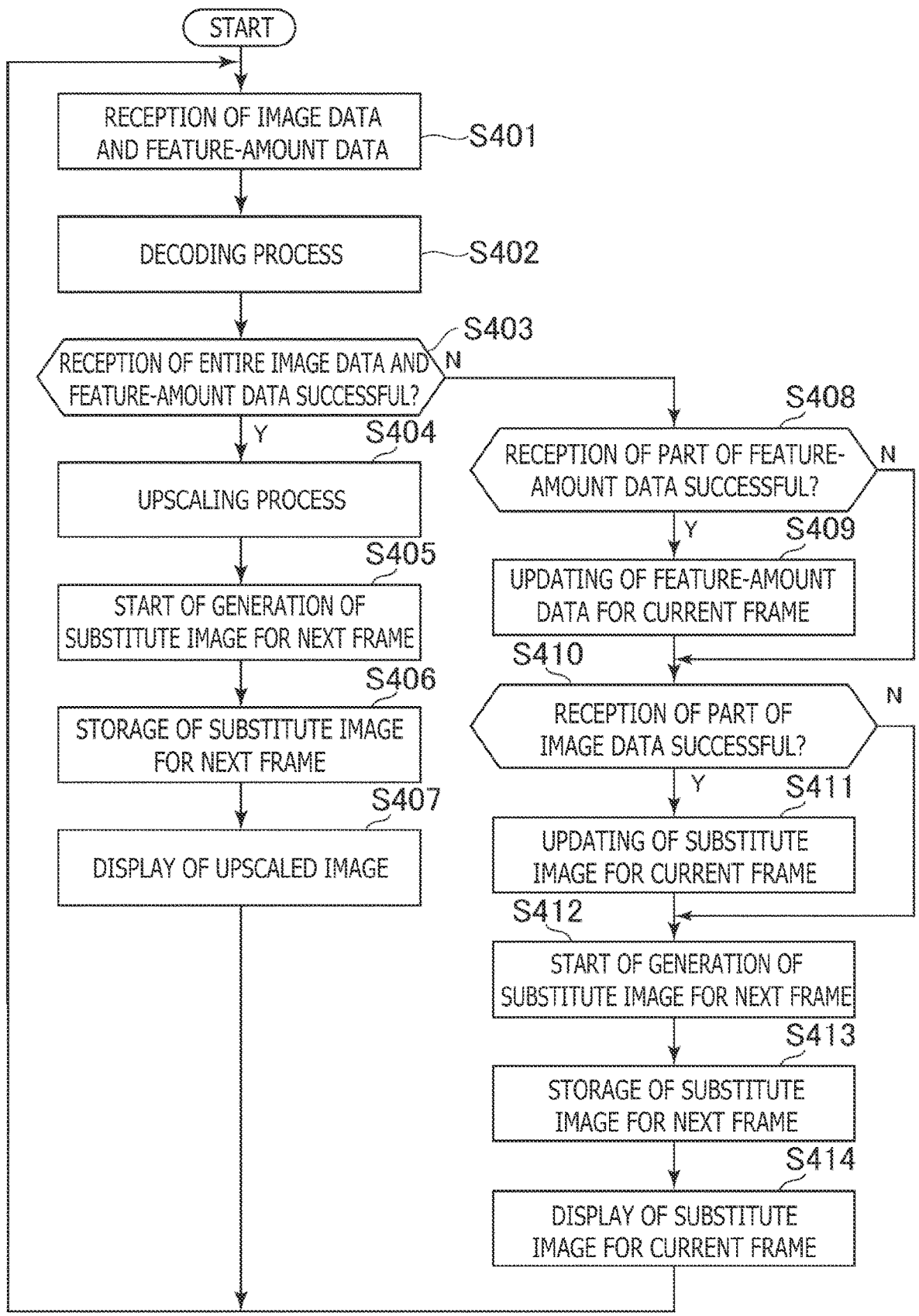
FIG. 13 is a flowchart depicting another example of the flow of processes performed at the terminal according to the one embodiment of the present invention.

Next, one example of a flow of a control process of displaying an upscaled image or a substitute image executed at the terminal 12 illustrated in FIG. 11 is explained with reference to a flowchart illustrated in FIG. 13. Processes depicted as S401 to S414 depicted in FIG. 13 are executed repeatedly at a predetermined frame rate (e.g., at 60 fps). Note that the processes depicted as S401 to S414 may be executed repeatedly at a variable frame rate.

First, the data receiving section 30 receives the image data, and the feature-amount data associated with the image data that are transmitted from the cloud server 10 in the process depicted as S305 (S401).

Then, the decoding processing section 32 executes a decoding process on the image data received in the process depicted as S401 to thereby generate a decoded image (S402).

Then, the upscaling section 34 confirms whether or not the reception of the entire image data and feature-amount data of the frame is successful (S403). In a case where the image data and feature-amount data do not arrive at the terminal 12 or in a case where the entire image data and feature-amount data received by the terminal 12 are corrupt, it is confirmed in the process depicted as S403 that the reception of the entire image data and feature-amount data of the frame is unsuccessful. In addition, in a case where the entire decoded image is not generated in the process depicted as S402, it may be confirmed in the process depicted as S403 that the reception of the entire image data and feature-amount data of the frame is unsuccessful. In addition, here, in a case where the reception of the entire image data and feature-amount data is unsuccessful, the data receiving section 30 may give the upscaling section 34 a notification to that effect. Then, when the upscaling section 34 receives the notification, it may be confirmed in the process depicted as S403 that the reception of the entire image data of the frame is unsuccessful.

It is supposed here that it is confirmed in the process depicted as S403 that the reception of the entire image data and feature-amount data of the frame is successful (S403: Y). In this case, the upscaling section 34 executes an upscaling process on the decoded image generated in the process depicted as S402 to thereby generate an upscaled image (S404). Here, an upscaling process using an upscaling model 62 illustrated in FIG. 14 which is a machine learning model having been obtained by learning is executed. Here, the upscaling model 62 may be one that uses a deep learning technology. The upscaling model 62 may include information regarding the coupling topology of each node included in a neural network, and information regarding parameters of coupling strengths.

In the process depicted as S404, for example, the decoded image generated in the process depicted as S402, and the feature-amount data received in the process depicted as S401 are input to the upscaling model 62. Then, an upscaled image according to the inputs is output from the upscaling model 62. Here, the upscaling model 62 is included in the upscaling section 34, for example.

Figure 14:
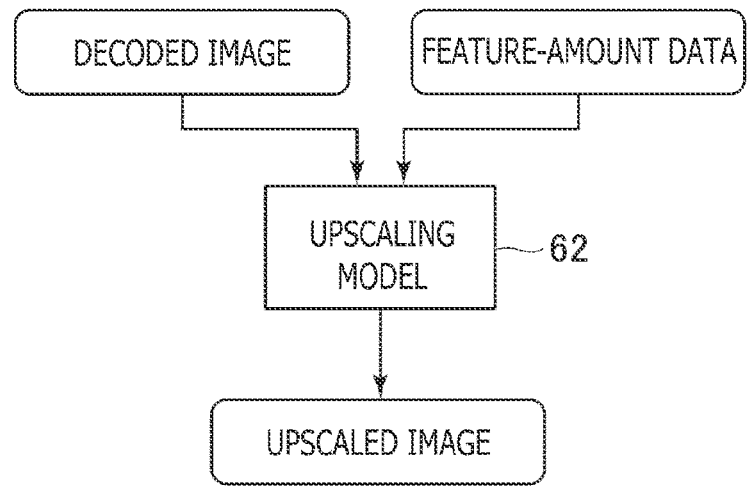
FIG. 14 is a figure schematically depicting another example of the upscaling model.
Figure 15:
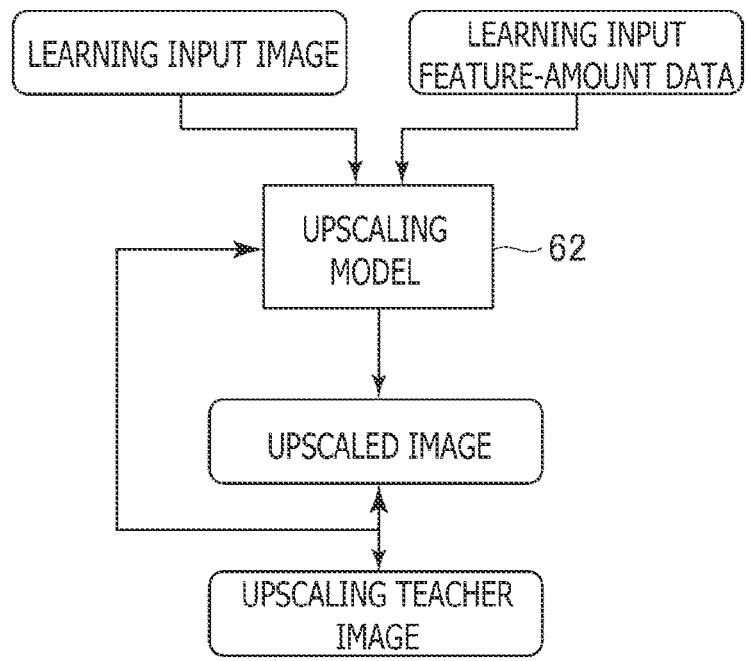
FIG. 15 is a figure schematically depicting one example of learning of the upscaling model depicted in FIG. 14.

FIG. 15 is a figure schematically depicting one example of the learning of the upscaling model 62 depicted in FIG. 14. Learning of the upscaling model 62 is executed by using a plurality of pieces of learning data, for example. The learning data includes learning input data including learning input images and learning input feature-amount data, and upscaling teacher images which are teacher data to be compared with upscaled images which are outputs of the upscaling model 62, for example.

For example, a learning input image which is a low-resolution image (e.g., a 2K image) may be generated by executing the downscaling process mentioned above, the encoding process mentioned above, and the decoding process mentioned above on a high-resolution image (e.g., a 4K image). Then, learning input feature-amount data which is feature-amount data corresponding to the high-resolution image may be generated by a process similar to the process mentioned above.

Then, learning data including learning input data including the learning input image mentioned above, and the learning input feature-amount data mentioned above, and an upscaling teacher image which is the high-resolution image mentioned above may be generated. Then, the learning of the upscaling model 62 may be executed by supervised learning using a plurality of pieces of learning data generated in this manner on the basis of many high-resolution images. For example, upscaled images which are outputs produced when the learning input data included in the learning data is input to the upscaling model 62, and upscaling teacher images included in the learning data may be compared. Then, the learning of the upscaling model 62 may be executed by updating parameters of the upscaling model 62 by error backpropagation (backpropagation) on the basis of results of the comparison.

Note that the learning of the upscaling model 62 is not limited to the method mentioned above. For example, the learning of the upscaling model 62 may be executed by unsupervised learning, reinforcement learning or the like.

When the process depicted as S404 ends, the substitute image generating section 38 starts generation of a substitute image for the next frame based on a basic image, and feature-amount data corresponding to the basic image (S405). Here, for example, the upscaling section 34 may store, on the image storage section 36, a basic image, and feature-amount data corresponding to the basic image in association with each other. Here, for example, the basic image is an image generated on the basis of the image data received in the process depicted as S401, and is an image used for generation of a substitute image. Here, for example, the upscaled image generated in the process depicted as S404 may be stored on the image storage section 36 as a basic image. In addition, for example, the decoded image generated in the process depicted as S402 may be stored on the image storage section 36 as a basic image. In addition, the feature-amount data stored on the image storage section 36 may be feature-amount data associated with the image data received in the process depicted as S401, for example. Then, the substitute image generating section 38 may start the generation of the substitute image based on the basic image, and the feature-amount data corresponding to the basic image that are stored on the image storage section 36.

Figure 16:
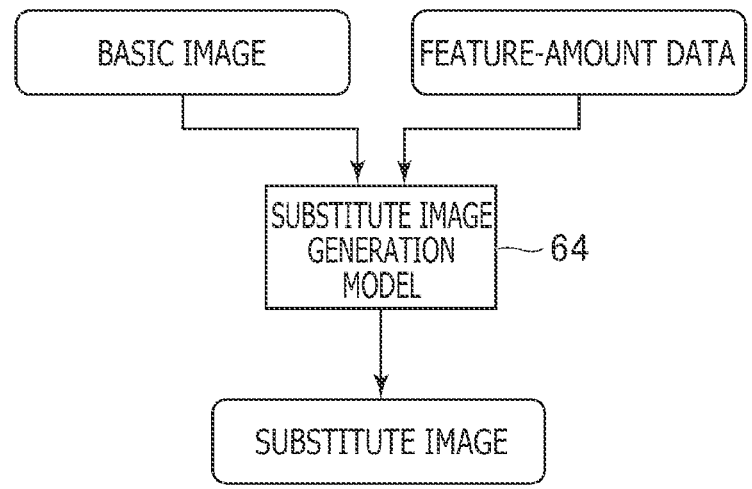
FIG. 16 is a figure schematically depicting another example of the substitute image generation model.

Here, execution of a substitute image generation process using a substitute image generation model 64 illustrated in FIG. 16 which is a machine learning model having been obtained by learning is started. Here, the substitute image generation model 64 may be one that uses a deep learning technology. The substitute image generation model 64 may include information regarding the coupling topology of each node included in a neural network, and information regarding parameters of coupling strengths.

In the process depicted as S405, for example, the basic image of the frame stored on the image storage section 36, and feature-amount data associated with the basic image, and having been transmitted for the frame are input to the substitute image generation model 64. Then, a substitute image according to the inputs is output from the substitute image generation model 64. Here, the substitute image generation model 64 is included in the substitute image generating section 38, for example.

Figure 17:
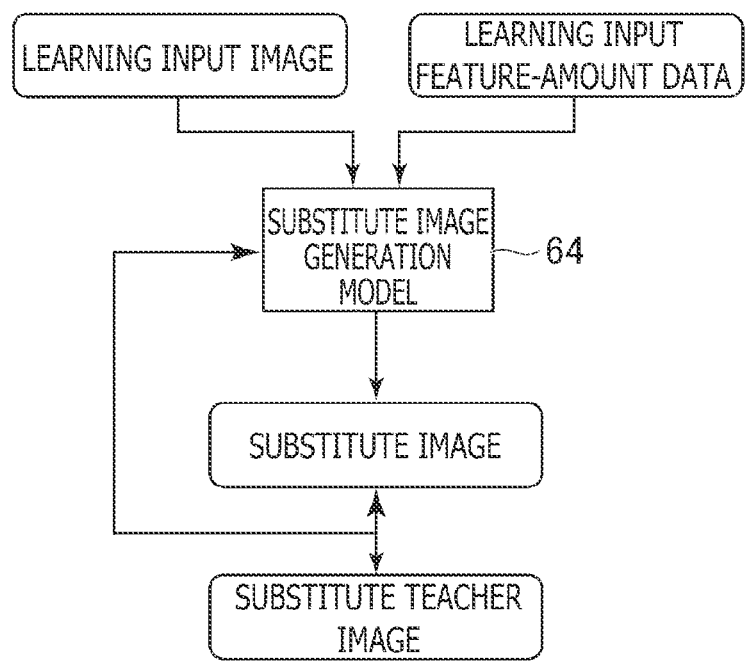
FIG. 17 is a figure schematically depicting one example of learning of the substitute image generation model depicted in FIG. 16.

FIG. 17 is a figure schematically depicting one example of the learning of the substitute image generation model 64 depicted in FIG. 16. Learning of the substitute image generation model 64 is executed by using a plurality of pieces of learning data, for example. The learning data includes learning input data including learning input images and learning input feature-amount data, and substitute teacher images which are teacher data to be compared with substitute images which are outputs of the substitute image generation model 64, for example.

For example, it is supposed here that the basic image is a decoded image. In this case, the downscaling process mentioned above, the encoding process mentioned above, and the decoding process mentioned above may be executed on a high-resolution image (e.g., a 4K image) which is a frame image included in a certain moving image. Then, a learning input image which is a low-resolution image (e.g., a 2K image) may be generated thereby. In addition, for example, it is supposed here that the basic image is an upscaled image. In this case, the downscaling process mentioned above, the encoding process mentioned above, the decoding process mentioned above, and the upscaling process mentioned above may be executed on a high-resolution image (e.g., a 4K image) which is a frame image included in a moving image. Then, a learning input image which is a high-resolution image may be generated thereby. Then, learning input feature-amount data which is feature-amount data corresponding to the high-resolution image may be generated by a process similar to the process mentioned above.

Then, learning data including learning input data including the learning input image mentioned above and the learning input feature-amount data mentioned above, and a substitute teacher image which is a frame image of a frame next to the frame image corresponding to the learning input image in the certain moving image mentioned above may be generated. Then, the learning of the substitute image generation model 64 may be executed by supervised learning using a plurality of pieces of learning data generated in this manner on the basis of many moving images and many frame images. For example, substitute images which are outputs produced when the learning input data included in the learning data is input to the substitute image generation model 64, and substitute teacher images included in the learning data may be compared. Then, the learning of the substitute image generation model 64 may be executed by updating parameters of the substitute image generation model 64 by error backpropagation (backpropagation) on the basis of results of the comparison.

Note that the learning of the substitute image generation model 64 is not limited to the method mentioned above. For example, the learning of the substitute image generation model 64 may be executed by unsupervised learning, reinforcement learning or the like.

Then, the substitute image generating section 38 stores, on the image storage section 36, the substitute image for the next frame, the generation of which has started in the process depicted as S405, and has ended (S406). In addition, in the process depicted as S406, the substitute image generating section 38 stores together, on the image storage section 36 and as feature-amount data for the next frame, feature-amount data used for the generation of the substitute image in the process depicted as S405.

Then, the display control section 40 causes the upscaled image generated in the process depicted as S404 to be displayed on the display section 12ƒ (S407), and the process returns to the process depicted as S401.

It is supposed here that it is confirmed in the process depicted as S403 that the reception of the entire image data and feature-amount data of the frame is unsuccessful (S403: N). In this case, the substitute image generating section 38 confirms whether or not the reception of part of the feature-amount data of the frame is successful (S408). In a case where part of the feature-amount data received by the terminal 12 is corrupt, it is confirmed in the process depicted as S408 that the reception of part of the feature-amount data of the frame is unsuccessful. In addition, in a case where part of the decoded image is not generated in the process depicted as S402, it may be confirmed in the process depicted as S408 that the reception of part of the feature-amount data of the frame is unsuccessful. In addition, here, in a case where the reception of part of the feature-amount data is unsuccessful, the data receiving section 30 may give the substitute image generating section 38 a notification to that effect. Then, when the substitute image generating section 38 receives the notification, it may be confirmed in the process depicted as S408 that the reception of part of the feature-amount data of the frame is unsuccessful.

It is supposed here that it is confirmed in the process depicted as S408 that the reception of part of the feature-amount data of the frame is successful (S408: Y). In this case, the substitute image generating section 38 updates the feature-amount data for the frame on the basis of the received part of the feature-amount data of the frame (S409).

In the process depicted as S409, the received feature-amount data of the frame is reflected in the feature-amount data for the frame. Here, a process of updating feature-amount data by using a feature-amount data updating model 66 illustrated in FIG. 18 which is a machine learning model having been obtained by learning is executed. Here, the feature-amount data updating model 66 may be one that uses a deep learning technology. The feature-amount data updating model 66 may include information regarding the coupling topology of each node included in a neural network, and information regarding parameters of coupling strengths.

In the process depicted as S409, for example, first feature-amount data stored in the process depicted as S406 for the previous frame, and partial feature-amount data which is the received part of the feature-amount data of the current frame are input to the feature-amount data updating model 66. Then, second feature-amount data according to the inputs is output from the feature-amount data updating model 66. In this way, the first feature-amount data stored in the process depicted as S406 for the previous frame is updated to the second feature-amount data. Here, the feature-amount data updating model 66 is included in the substitute image generating section 38, for example.

Figure 18:
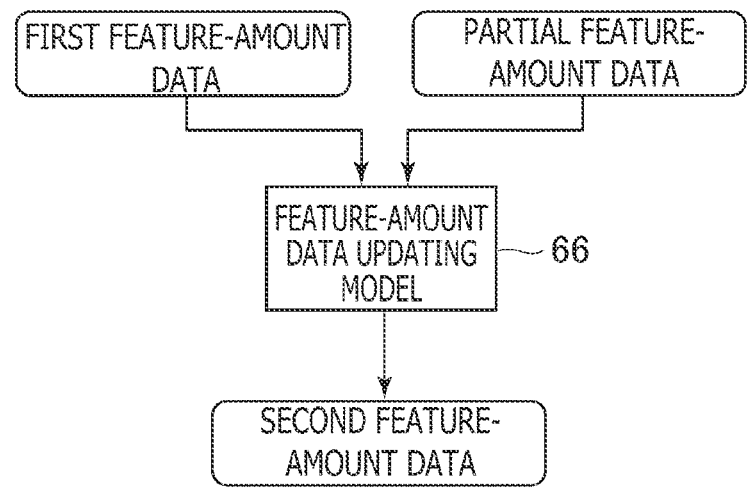
FIG. 18 is a figure schematically depicting one example of a feature-amount data updating model.
Figure 19:
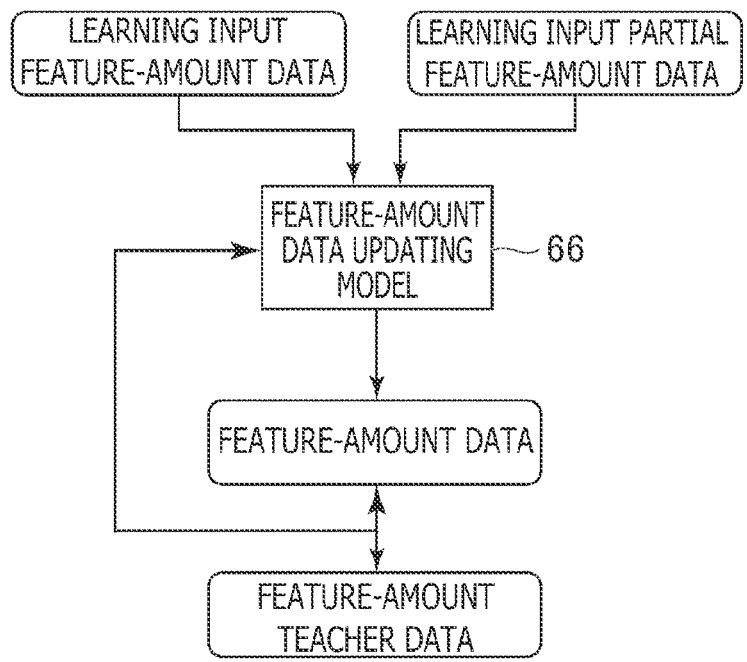
FIG. 19 is a figure schematically depicting one example of learning of the feature-amount data updating model depicted in FIG. 18.

FIG. 19 is a figure schematically depicting one example of the learning of the feature-amount data updating model 66 depicted in FIG. 18. Learning of the feature-amount data updating model 66 is executed by using a plurality of pieces of learning data, for example. The learning data includes learning input data including learning input feature-amount data and learning input partial feature-amount data, and feature-amount teacher data which is teacher data to be compared with feature-amount data which is an output of the feature-amount data updating model 66, for example.

For example, learning input feature-amount data which is feature-amount data corresponding to a high-resolution image (e.g., a 4K image) which is a first frame image included in a certain moving image may be generated by a process similar to the process mentioned above. Then, learning input partial feature-amount data which is part of feature-amount data corresponding to a second frame image which is a frame image of a frame next to the first frame image in the certain moving image mentioned above may be generated by a process similar to the process mentioned above.

Then, learning data including learning input data including the learning input feature-amount data mentioned above and the learning input partial feature-amount data mentioned above, and feature-amount teacher data which is the feature-amount data corresponding to the second frame image generated by a process similar to the process mentioned above may be generated. Then, the learning of the feature-amount data updating model 66 may be executed by supervised learning using a plurality of pieces of learning data generated in this manner on the basis of many moving images and many frame images. For example, feature-amount data which is an output produced when the learning input data included in the learning data is input to the feature-amount data updating model 66, and the feature-amount teacher data included in the learning data may be compared. Then, the learning of the feature-amount data updating model 66 may be executed by updating parameters of the feature-amount data updating model 66 by error backpropagation (backpropagation) on the basis of results of the comparison.

Note that the learning of the feature-amount data updating model 66 is not limited to the method mentioned above. For example, the learning of the feature-amount data updating model 66 may be executed by unsupervised learning, reinforcement learning or the like.

It is supposed here that the process depicted as S409 has ended or it is confirmed in the process depicted as S408 that the reception of part of the feature-amount data of the frame is unsuccessful (S408: N). In these cases, the substitute image generating section 38 confirms whether or not the reception of part of the image data of the frame is successful (S410). In a case where part of the image data received by the terminal 12 is corrupt, it is confirmed in the process depicted as S410 that the reception of part of the image data of the frame is unsuccessful. In addition, in a case where part of the decoded image is not generated in the process depicted as S402, it may be confirmed in the process depicted as S410 that the reception of part of the image data of the frame is unsuccessful. In addition, here, in a case where the reception of part of the image data is unsuccessful, the data receiving section 30 may give the substitute image generating section 38 a notification to that effect. Then, when the substitute image generating section 38 receives the notification, it may be confirmed in the process depicted as S410 that the reception of part of the image data of the frame is unsuccessful.

It is supposed here that it is confirmed in the process depicted as S410 that the reception of part of the image data of the frame is successful (S410: Y). In this case, the substitute image generating section 38 updates a substitute image for the frame on the basis of the received part of the image data of the frame (S411). Here, for example, the received part of the image data of the frame is reflected in the substitute image for the frame. Here, a process of updating a substitute image by using a substitute image updating model 68 illustrated in FIG. 20 which is a machine learning model having been obtained by learning is executed. Here, the substitute image updating model 68 may be one that uses a deep learning technology. The substitute image updating model 68 may include information regarding the coupling topology of each node included in a neural network, and information regarding parameters of coupling strengths.

In the process depicted as S411, for example, a first substitute image stored in the process depicted as S406 for the previous frame, partial image data which is the received part of the image data of the current frame, and the feature-amount data are input to the substitute image updating model 68. Here, in a case where the process depicted as S409 is executed, feature-amount data for the frame having been updated is input to the substitute image updating model 68. On the other hand, in a case where the process depicted as S409 is not executed, feature-amount data for the frame stored in the previous frame is input to the substitute image updating model 68. Then, a second substitute image according to the inputs is output from the substitute image updating model 68. In this way, the first substitute image stored in the process depicted as S406 for the previous frame is updated to the second substitute image. Here, the substitute image updating model 68 is included in the substitute image generating section 38, for example.

Figure 20:
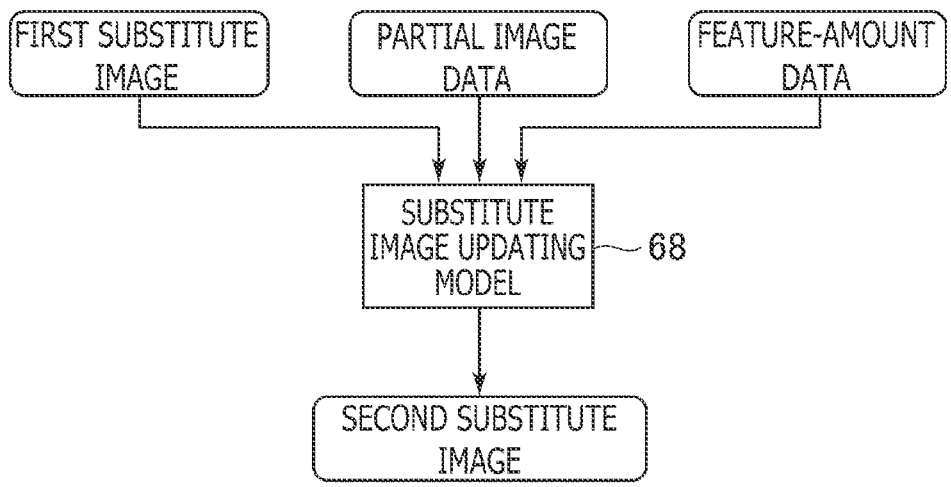
FIG. 20 is a figure schematically depicting another example of the substitute image updating model.
Figure 21:
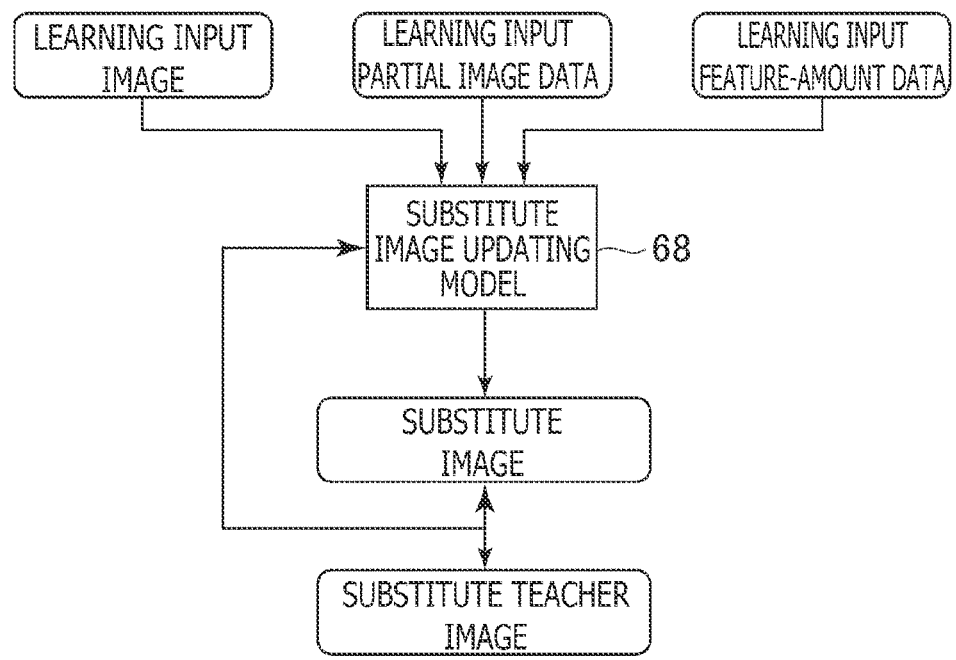
FIG. 21 is a figure schematically depicting one example of learning of the substitute image updating model depicted in FIG. 20.

FIG. 21 is a figure schematically depicting one example of the learning of the substitute image updating model 68 depicted in FIG. 20. Learning of the substitute image updating model 68 is executed by using a plurality of pieces of learning data, for example. The learning data includes learning input data including learning input images, learning input partial image data and learning input feature-amount data, and substitute teacher images which are teacher data to be compared with substitute images which are outputs of the substitute image updating model 68, for example.

For example, it is supposed here that the basic image is a decoded image. In this case, the downscaling process mentioned above, the encoding process mentioned above, and the decoding process mentioned above may be executed on a high-resolution image (e.g., a 4K image) which is a frame image included in a certain moving image. Then, a learning input image which is a low-resolution image (e.g., a 2K image) may be generated thereby. In addition, for example, it is supposed here that the basic image is an upscaled image. In this case, the downscaling process mentioned above, the encoding process mentioned above, the decoding process mentioned above, and the upscaling process mentioned above may be executed on a high-resolution image (e.g., a 4K image) which is a frame image included in a moving image. Then, a learning input image which is a high-resolution image may be generated thereby.

Then, learning input partial image data which is part of image data generated by executing the downscaling process mentioned above, and the encoding process mentioned above on a second frame image which is a frame image of a frame next to the first frame image corresponding to the learning input image in the certain moving image mentioned above may be generated. Then, learning input feature-amount data which is feature-amount data corresponding to the first frame image may be generated by a process similar to the process mentioned above. Note that feature-amount data obtained by updating the feature-amount data corresponding to the first frame image on the basis of feature-amount data corresponding to the second frame image may be used as learning input feature-amount data.

Then, learning data including learning input data including the learning input image mentioned above, the learning input partial image data mentioned above, and the learning input feature-amount data mentioned above, and a substitute teacher image which is the second frame image mentioned above may be generated. Then, the learning of the substitute image updating model 68 may be executed by supervised learning using a plurality of pieces of learning data generated in this manner on the basis of many moving images and many frame images. For example, substitute images which are outputs produced when the learning input data included in the learning data is input to the substitute image updating model 68, and substitute teacher images included in the learning data may be compared. Then, the learning of the substitute image updating model 68 may be executed by updating parameters of the substitute image updating model 68 by error backpropagation (backpropagation) on the basis of results of the comparison.

Note that the learning of the substitute image updating model 68 is not limited to the method mentioned above. For example, the learning of the substitute image updating model 68 may be executed by unsupervised learning, reinforcement learning or the like.

In a case where the process depicted as S411 has ended or in a case where it is confirmed in the process depicted as S410 that the reception of part of the image data of the frame is unsuccessful (S410: N), the substitute image generating section 38 starts generation of a substitute image for the next frame (S412). Here, in a case where the process depicted as S411 has ended, the substitute image generating section 38 may store, on the image storage section 36 and as a basic image, the substitute image updated in the process depicted as S411. In addition, in a case where the reception of part of the image data of the frame is unsuccessful in the process depicted as S410, a substitute image stored in the process depicted as S406 for the previous frame may be stored on the image storage section 36 as a basic image. In addition, in a case where the process depicted as S409 is executed, the substitute image generating section 38 may store the feature-amount data having been updated, on the image storage section 36 in association with the basic image. In addition, in a case where the process depicted as S409 is not executed, the substitute image generating section 38 may store the feature-amount data for the frame on the image storage section 36 in association with the basic image. Then, the substitute image generating section 38 may start the generation of the substitute image for the next frame on the basis of the basic image, and feature-amount data associated with the basic image.

Here, execution of a substitute image generation process using the substitute image generation model 64 illustrated in FIG. 16 which is a machine learning model having been obtained by learning is started. Here, the substitute image generation model 64 may be one that uses a deep learning technology.

Then, the substitute image generating section 38 stores, on the image storage section 36, the substitute image for the next frame, the generation of which has started in the process depicted as S412, and has ended (S413). Here, in a case where the process depicted as S409 is executed, the substitute image generating section 38 stores the feature-amount data having been updated, on the image storage section 36 as feature-amount data for the next frame in association with the substitute image. In addition, in a case where the process depicted as S409 is not executed, the substitute image generating section 38 stores the feature-amount data for the frame on the image storage section 36 as feature-amount data for the next frame in association with the substitute image.

Then, the display control section 40 causes the substitute image generated in the frame to be displayed on the display section 12f (S414), and the process returns to the process depicted as S401.

In this process example, it is supposed here that it is confirmed in the n-th frame that reception of entire image data and feature-amount data of the n-th frame is successful (S403: Y). In this case, an upscaled image generated on the basis of the image data and feature-amount data received for the n-th frame is displayed (S407). In addition, in this case, in the n-th frame, a substitute image for an (n+1)-th frame is generated on the basis of the upscaled image and the feature-amount data (S405, S406).

It is supposed here that, in the n-th frame, the reception of the entire image data of the n-th frame is unsuccessful (S403: N). It is supposed in this case that it is confirmed that the reception of part of the image data of the n-th frame is successful (S410: Y). In this case, in the n-th frame, a substitute image for the n-th frame generated in the (n−1)-th frame is updated (S411). Then, the substitute image for the n-th frame having been updated is displayed (S414). In addition, in this case, in the n-th frame, a substitute image for the (n+1)-th frame is generated on the basis of the substitute image for the n-th frame having been updated, and the feature-amount data for the n-th frame (S412, S413).

It is supposed here that, in the n-th frame, the reception of the entire image data of the n-th frame is unsuccessful (S403: N). It is supposed in this case that it is confirmed that the reception of part of the image data of the n-th frame is unsuccessful (S410: N). In this case, in the n-th frame, the substitute image for the n-th frame generated in the (n−1)-th frame is displayed (S414). In addition, in this case, in the n-th frame, a substitute image for the (n+1)-th frame is generated on the basis of the substitute image for the n-th frame generated in the (n−1)-th frame, and the feature-amount data for the n-th frame (S412, S413).

In addition, in a case where reception of part of the feature-amount data is successful in the n-th frame (S408: Y), feature-amount data for the n-th frame generated in the (n−1)-th frame is updated (S409).

In a case where the partial feature-amount data includes data of ME information, data representing an optical flow and the like, it becomes possible to generate a substitute image reflecting a prediction of the movement of an object represented by an image. At this time, other feature amounts represented by the partial feature-amount data also can be made use of for increasing the prediction precision. The partial feature-amount data can be made use of not only for an enhancement of the quality of an upscaled image, but also for an enhancement of the reproducibility of temporal intra-image changes of an object in a substitute image from the previous frame.

In addition, in this process example, the display of the upscaled image, or the display of the substitute image for the frame may be executed without waiting for the start of generation of a substitute image for the next frame, and the end of storage of the substitute image for the next frame.

In addition, reception of entire feature-amount data associated with image data which has been received unsuccessfully is successful, in some cases. For example, in such a case, the substitute image generating section 38 may generate a substitute image on the basis of first image data, and feature-amount data associated with second image data. In addition, in a case where reception of feature-amount data is unsuccessful but reception of entire image data is successful, an upscaled image generated on the basis of the image data may be displayed.

In addition, the substitute image updating model 68 may output a determination value representing whether or not an imaginary image different from an image that actually should be displayed is to be output as a second substitute image. For example, in a case where an imaginary image different from an image that actually should be displayed is output as a second substitute image, the determination value "1" may be output, and in a case where an image that actually should be displayed is output as a second substitute image, the determination value "0" may be output. In this case, the learning of the substitute image updating model 68 may be executed by using teacher data including certain learning determination values according to learning input data that are to be compared with determination values output by the substitute image updating model 68 according to input of the learning input data. In this case, the determination value may be output together from the substitute image updating model 68 in the process depicted as S411.

Then, on the basis of the determination value, in the process depicted as S414, the display control section 40 may control whether or not to cause a substitute image generated in the frame to be displayed on the display section 12f. For example, in a case where the determination value "1" is output from the substitute image updating model 68, the display control section 40 may perform control such that the substitute image is not displayed. In addition, in a case where the determination value "0" is output from the substitute image updating model 68, the display control section 40 may perform control such that the substitute image is displayed.

In addition, similarly, the substitute image generation model 64 may output a determination value representing whether or not an imaginary image different from an image that actually should be displayed is to be output as a substitute image. For example, in a case where an imaginary image different from an image that actually should be displayed is output as a substitute image, the determination value "1" may be output, and in a case where an image that actually should be displayed is output as a substitute image, the determination value "0" may be output. In this case, the learning of the substitute image generation model 64 may be executed by using teacher data including certain learning determination values according to learning input data that are to be compared with determination values output by the substitute image generation model 64 according to input of the learning input data. In this case, the determination value may be output together from the substitute image generation model 64 in the processes depicted as S405 or S412.

Then, on the basis of the determination value, in the process depicted as S414 for the next frame, the display control section 40 may control whether or not to cause a substitute image generated in the current frame to be displayed on the display section 12*f*. For example, in a case where the determination value "1" is output from the substitute image generation model 64, the display control section 40 may perform control such that the substitute image is not displayed. In addition, in a case where the determination value "0" is output from the substitute image generation model 64, the display control section 40 may perform control such that the substitute image is displayed.

Here, for example, in a case where the determination value "1" is output from either the substitute image generation model 64 or the substitute image updating model 68, the display control section 40 may perform control such that the substitute image is not displayed.

According to the present embodiment, it is made possible to reduce a risk of being unable to receive image data by a timing when the image data should be displayed if retransmission of the data is started after a failure of reception of the image data is confirmed.

Note that the present invention is not limited to the embodiment mentioned above.

For example, the upscaling model 50 may be implemented with a recurrent neural network (RNN). Then, in this case, the upscaling section 34 of the terminal 12 may store the decoded image generated in the process depicted as S202.

Then, in this case, in the process depicted as S204, a chronologically ordered series of decoded images including the latest decoded image may be input to the upscaling model 50. Then, an upscaled image according to the input may be output from the upscaling model 50.

Here, in the learning of the upscaling model 50, a chronologically ordered series of learning input images which are low-resolution images (e.g., 2K images) may be generated by executing the downscaling process mentioned above, the encoding process mentioned above, and the decoding process mentioned above on each of a series of high-resolution images (e.g., 4K images) (a chronologically ordered series of high-resolution images).

Then, learning data including learning input data including the chronologically ordered series of learning input images mentioned above, and an upscaling teacher image which is the last image in the chronologically ordered series of high-resolution images mentioned above may be generated. Then, the learning of the upscaling model 50 may be executed by supervised learning using a plurality of pieces of learning data generated in this manner on the basis of many chronologically ordered series of high-resolution images. For example, upscaled images which are outputs produced when the learning input data included in the learning data is input to the upscaling model 50, and upscaling teacher images included in the learning data may be compared. Then, the learning of the upscaling model 50 may be executed by updating parameters of the upscaling model 50 by error backpropagation (backpropagation) on the basis of results of the comparison.

In addition, for example, the substitute image generating section 38 may generate a substitute image on the basis of a chronologically ordered series of image data received by the terminal 12.

Here, for example, the substitute image generation model 52 may be implemented with a recurrent neural network (RNN). Then, in this case, the substitute image generating section 38 of the terminal 12 may store a basic image.

Then, in this case, in the process depicted as S205 or S210, a chronologically ordered series of basic images including the latest basic image may be input to the substitute image generation model 52. Then, a substitute image according to the input may be output from the substitute image generation model 52.

For example, it is supposed here that the basic image is a decoded image. In this case, in the learning of the substitute image generation model 52, a chronologically ordered series of learning input images which are low-resolution images (e.g., 2K images) may be generated by executing the downscaling process mentioned above, the encoding process mentioned above, and the decoding process mentioned above on each of a series of high-resolution images (e.g., 4K images) (a chronologically ordered series of high-resolution images) included in a certain moving image. In addition, for example, it is supposed here that the basic image is an upscaled image. In this case, in the learning of the substitute image generation model 52, the downscaling process mentioned above, the encoding process mentioned above, the decoding process mentioned above, and the upscaling process mentioned above may be executed on each of a series of high-resolution images (e.g., 4K images) included in a certain moving image. Then, a chronologically ordered series of learning input images which are high-resolution images may be generated thereby.

Then, learning data including learning input data including the chronologically ordered series of learning input images mentioned above, and a substitute teacher image which is a frame image of a frame next to the series of high-resolution images mentioned above in the certain moving image mentioned above may be generated. Then, the learning of the substitute image generation model 52 may be executed by supervised learning using a plurality of pieces of learning data generated in this manner on the basis of many moving images and many frame images. For example, substitute images which are outputs produced when the learning input data included in the learning data is input to the substitute image generation model 52, and substitute teacher images included in the learning data may be compared. Then, the learning of the substitute image generation model 52 may be executed by updating parameters of the substitute image generation model 52 by error backpropagation (backpropagation) on the basis of results of the comparison.

In addition, for example, the substitute image updating model 54 may be implemented with a recurrent neural network (RNN). Then, in this case, the substitute image generating section 38 of the terminal 12 may store a substitute image.

Then, in this case, a chronologically ordered series of substitute images including a substitute image of the previous frame, and partial image data which is received part of image data of the current frame may be input to the substitute image updating model 54. Then, a second substitute image according to the inputs may be output from the substitute image updating model 54.

For example, it is supposed here that the basic image is a decoded image. In this case, in the learning of the substitute image updating model 54, a chronologically ordered series of learning input images which are low-resolution images (e.g., 2K images) may be generated by executing the downscaling process mentioned above, the encoding process mentioned above, and the decoding process mentioned above on each of a series of high-resolution images (e.g., 4K images) (a chronologically ordered series of high-resolution images) included in a certain moving image. In addition, for example, it is supposed here that the basic image is an upscaled image. In this case, in the learning of the substitute image updating model 54, the downscaling process mentioned above, the encoding process mentioned above, the decoding process mentioned above, and the upscaling process mentioned above may be executed on each of a series of high-resolution images (e.g., 4K images) included in a certain moving image. Then, a chronologically ordered series of learning input images which are high-resolution images may be generated thereby.

Then, learning input partial image data which is part of image data generated by executing the downscaling process mentioned above, and the encoding process mentioned above on a frame image of a frame next to the series of high-resolution images mentioned above in the certain moving image mentioned above may be generated.

Then, learning data including learning input data including the chronologically ordered series of learning input images and learning input partial image data mentioned above, and a substitute teacher image which is a frame image of a frame next to the series of high-resolution images mentioned above in the certain moving image mentioned above may be generated. Then, the learning of the substitute image updating model 54 may be executed by supervised learning using a plurality of pieces of learning data generated in this manner on the basis of many moving images and many frame images. For example, substitute images which are outputs produced when the learning input data included in the learning data is input to the substitute image updating model 54, and substitute teacher images included in the learning data may be compared. Then, the learning of the substitute image updating model 54 may be executed by updating parameters of the substitute image updating model 54 by error backpropagation (backpropagation) on the basis of results of the comparison.

In addition, for example, the upscaling model 62 may be implemented with a recurrent neural network (RNN). Then, in this case, the up scaling section 34 of the terminal 12 may store the decoded image generated in the process depicted as S402, and the feature-amount data received in the process depicted as S401.

Then, in this case, in the process depicted as S404, a chronologically ordered series of decoded images including the latest decoded image, and a chronologically ordered series of feature-amount data including the latest feature-amount data may be input to the upscaling model 62. Then, an upscaled image according to the inputs may be output from the upscaling model 62.

Here, in the learning of the upscaling model 62, a chronologically ordered series of learning input images which are low-resolution images (e.g., 2K images) may be generated by executing the downscaling process mentioned above, the encoding process mentioned above, and the decoding process mentioned above on each of a series of high-resolution images (e.g., 4K images) (a chronologically ordered series of high-resolution images). Then, a chronologically ordered series of learning input feature-amount data which is a chronologically ordered series of feature-amount data corresponding to the series of high-resolution images may be generated by a process similar to the process mentioned above.

Then, learning data including learning input data including the chronologically ordered series of learning input images mentioned above and the chronologically ordered series of learning input feature-amount data mentioned above, and an upscaling teacher image which is the last image in the chronologically ordered series of high-resolution images mentioned above may be generated. Then, the learning of the upscaling model 62 may be executed by supervised learning using a plurality of pieces of learning data generated in this manner on the basis of many chronologically ordered series of high-resolution images. For example, upscaled images which are outputs produced when the learning input data included in the learning data is input to the upscaling model 62, and upscaling teacher images included in the learning data may be compared. Then, the learning of the upscaling model 62 may be executed by updating parameters of the upscaling model 62 by error backpropagation (backpropagation) on the basis of results of the comparison.

In addition, for example, the substitute image generation model 64 may be implemented with a recurrent neural network (RNN). Then, in this case, the substitute image generating section 38 of the terminal 12 may store a basic image, and feature-amount data associated with the basic image.

Then, in this case, a chronologically ordered series of basic images including the latest basic image, and a chronologically ordered series of feature-amount data including the latest feature-amount data may be input to the substitute image generation model 64. Then, a substitute image according to the inputs may be output from the substitute image generation model 64.

For example, it is supposed here that the basic image is a decoded image. In this case, in the learning of the substitute image generation model 64, a chronologically ordered series of learning input images which are low-resolution images (e.g., 2K images) may be generated by executing the downscaling process mentioned above, the encoding process mentioned above, and the decoding process mentioned above on each of a series of high-resolution images (e.g., 4K images) (a chronologically ordered series of high-resolution images) included in a certain moving image. In addition, for example, it is supposed here that the basic image is an upscaled image. In this case, in the learning of the substitute image generation model 64, the downscaling process mentioned above, the encoding process mentioned above, the decoding process mentioned above, and the upscaling process mentioned above may be executed on each of a series of high-resolution images (e.g., 4K images) included in a certain moving image. Then, a chronologically ordered series of learning input images which are high-resolution images may be generated thereby. Then, a chronologically ordered series of learning input feature-amount data corresponding to the chronologically ordered series of high-resolution images may be generated by a process similar to the process mentioned above.

Then, learning data including learning input data including the chronologically ordered series of learning input images mentioned above, and the chronologically ordered series of learning input feature-amount data mentioned above, and a substitute teacher image which is a frame image of a frame next to the series of high-resolution images may be generated. Then, the learning of the substitute image generation model 64 may be executed by supervised learning using a plurality of pieces of learning data generated in this manner on the basis of many moving images and many frame images. For example, substitute images which are outputs produced when the learning input data included in the learning data is input to the substitute image generation model 64, and substitute teacher images included in the learning data may be compared. Then, the learning of the substitute image generation model 64 may be executed by updating parameters of the substitute image generation model 64 by error backpropagation (backpropagation) on the basis of results of the comparison.

In addition, for example, the feature-amount data updating model 66 may be implemented with a recurrent neural network (RNN). Then, in this case, the substitute image generating section 38 of the terminal 12 may store feature-amount data.

Then, in this case, a chronologically ordered series of feature-amount data including feature-amount data of the previous frame, and partial feature-amount data which is received part of feature-amount data of the current frame may be input to the feature-amount data updating model 66. Then, second feature-amount data according to the inputs may be output from the feature-amount data updating model 66.

In the learning of the feature-amount data updating model 66, a chronologically ordered series of learning input feature-amount data which is a chronologically ordered series of feature-amount data corresponding to a series of high-resolution images (e.g., 4K images) included in a certain moving image may be generated by a processes similar to the process mentioned above. Then, learning input partial feature-amount data which is part of feature-amount data corresponding to a second frame image which is a frame image of a frame next to the series of high-resolution images may be generated by a process similar to the process mentioned above.

Then, learning data including learning input data including the chronologically ordered series of learning input feature-amount data mentioned above, and the learning input partial feature-amount data mentioned above, and the feature-amount teacher data which is feature-amount data corresponding to the second frame image mentioned above may be generated. Then, the learning of the feature-amount data updating model 66 may be executed by supervised learning using a plurality of pieces of learning data generated in this manner on the basis of many moving images and many frame images. For example, feature-amount data which is an output produced when the learning input data included in the learning data is input to the feature-amount data updating model 66, and the feature-amount teacher data included in the learning data may be compared. Then, the learning of the feature-amount data updating model 66 may be executed by updating parameters of the feature-amount data updating model 66 by error backpropagation (backpropagation) on the basis of results of the comparison.

In addition, for example, the substitute image updating model 68 may be implemented with a recurrent neural network (RNN). Then, in this case, the substitute image generating section 38 of the terminal 12 may store a substitute image, and feature-amount data.

Then, in this case, a chronologically ordered series of substitute images including a substitute image of the previous frame, a chronologically ordered series of feature-amount data corresponding to the chronologically ordered series of substitute images including the substitute image of the previous frame, and partial image data which is the received part of the image data of the current frame may be input to the substitute image updating model 68. Then, a second substitute image according to the inputs may be output from the substitute image updating model 68.

For example, it is supposed here that the basic image is a decoded image. In this case, in the learning of the substitute image updating model 68, a chronologically ordered series of learning input images which are low-resolution images (e.g., 2K images) may be generated by executing the downscaling process mentioned above, the encoding process mentioned above, and the decoding process mentioned above on each of a series of high-resolution images (e.g., 4K images) (a chronologically ordered series of high-resolution images) included in a certain moving image. In addition, for example, it is supposed here that the basic image is an upscaled image. In this case, in the learning of the substitute image updating model 68, the downscaling process mentioned above, the encoding process mentioned above, the decoding process mentioned above, and the upscaling process mentioned above may be executed on each of a series of high-resolution images (e.g., 4K images) included in a certain moving image. Then, a chronologically ordered series of learning input images which are high-resolution images may be generated thereby. In addition, a chronologically ordered series of learning input feature-amount data corresponding to the chronologically ordered series of high-resolution images may be generated by a process similar to the process mentioned above.

Then, learning input partial image data which is part of image data generated by executing the downscaling process mentioned above, and the encoding process mentioned above on a frame image of a frame next to the series of high-resolution images mentioned above in the certain moving image mentioned above may be generated.

Then, learning data including learning input data including the chronologically ordered series of learning input images mentioned above, the chronologically ordered series of learning input feature-amount data mentioned above, and the learning input partial image data, and a substitute teacher image which is a frame image of a frame next to the series of high-resolution images mentioned above may be generated. Then, the learning of the substitute image updating model 68 may be executed by supervised learning using a plurality of pieces of learning data generated in this manner on the basis of many moving images and many frame images. For example, substitute images which are outputs produced when the learning input data included in the learning data is input to the substitute image updating model 68, and substitute teacher images included in the learning data may be compared. Then, the learning of the substitute image updating model 68 may be executed by updating parameters of the substitute image updating model 68 by error backpropagation (backpropagation) on the basis of results of the comparison.

By using a machine learning model to which a chronologically ordered series of data is input in the present embodiment in the manner mentioned above, data taking into consideration a prediction of a change that occurs in the frame on the basis of a chronologically ordered series of data of the past frames is output from the machine learning model. Because of this, the precision of output results of the machine learning model can be enhanced further.

In addition, in the present embodiment, for example, the upscaling model 50 may be implemented with a generative adversarial network (GAN). In addition, for example, the substitute image generation model 52 may be implemented with a generative adversarial network (GAN). In addition, for example, the substitute image updating model 54 may be implemented with a generative adversarial network (GAN). In addition, for example, the upscaling model 62 may be implemented with a generative adversarial network (GAN). In addition, for example, the substitute image generation model 64 may be implemented with a generative adversarial network (GAN). In addition, for example, the feature-amount data updating model 66 may be implemented with a generative adversarial network (GAN). In addition, for example, the substitute image updating model 68 may be implemented with a generative adversarial network (GAN).

In addition, for example, the upscaling section 34 of the terminal 12 may decide whether or not it is necessary to execute super-resolution processing on the basis of data included in feature-amount data, and representing whether or not it is necessary to execute super-resolution processing. Then, in a case where it is decided not to execute super-resolution processing, the upscaling section 34 may perform control such that an upscaling process is not executed. In addition, in a case where it is decided not to execute super-resolution processing, the upscaling section 34 may control the substitute image generating section 38 not to execute a substitute image generation process. Then, in this case, the display control section 40 may cause a decoded image, or an image displayed in the previous frame to be displayed on the display section 12f.

In addition, for example, the substitute image generating section 38 of the terminal 12 may decide whether or not to generate a substitute image on the basis of a basic image. Here, the substitute image generation model 52 having been obtained by learning for which learning by a method similar to the method mentioned above has been executed, and which outputs information representing whether or not to generate a substitute image may be used to decide whether or not to generate a substitute image. In addition, the substitute image generating section 38 may decide whether or not to generate a substitute image on the basis of a basic image, and feature-amount data associated with the basic image. Here, the substitute image generation model 64 having been obtained by learning for which learning by a method similar to the method mentioned above has been executed, and which outputs information representing whether or not to generate a substitute image may be used to decide whether or not to generate a substitute image. Then, when it is decided not to generate a substitute image, the display control section 40 may cause a decoded image, or an image displayed in the previous frame to be displayed on the display section 12f.

In addition, for example, a play image before being downscaled may be divided into a plurality of partial images. Here, for example, a play image may be divided into a plurality of partial images occupying rectangular regions with sizes such as 8×8 pixels or 32×32 pixels. In addition, for example, by dividing a play image in the lateral direction, a play image may be divided into a plurality of sliced (stripe-like) partial images formed with a bundle of a plurality of lines (e.g., 32 lines). In this case, the partial images are equivalent to original images mentioned above. Then, the series of processes depicted as S102 to S104 depicted in FIG. 3, and S201 to S212 depicted in FIG. 4 may be executed on the original images, which are the partial images. Alternatively, the series of processes depicted as S302 to S305 depicted in FIG. 12, and S401 to S414 depicted in FIG. 13 may be executed on the original images, which are the partial images.

In addition, no matter whether play images are equivalent to original images or partial images are equivalent to original images, the processes depicted as S204, S206, S209, S211, S404, S406, S411, and S413 may be executed at a granularity smaller than the original images. For example, the processes depicted as S204, S206, S404, and S406 may be executed for each 8×8-pixel image, for each 32×32-pixel image or for each image with another smaller size. Here, when the resolution of a decoded image is 1920×1088 pixels, and the processes mentioned above are executed for each 32×32-pixel image, the processes are executed 60×24 times. In this case, learning input images used for learning of a machine learning model may be images with the same shape and the same size as those of images input to the machine learning model in the processes.

In addition, the processes depicted as S404, S409, S411, and S413 may be executed at a granularity smaller than the granularity of feature-amount data. In this case, learning input partial feature-amount data and learning input feature-amount data used for learning of a machine learning model may be data with the same size as the size of data input to the machine learning model in the processes.

In addition, the upscaling section 34 may generate an upscaled image by executing super-resolution processing or extrapolation. In addition, the substitute image generating section 38 may generate a substitute image by executing extrapolation.

In addition, the upscaling model 50, the substitute image generation model 52, the substitute image updating model 54, the upscaling model 62, the substitute image generation model 64, the feature-amount data updating model 66, and the substitute image updating model 68 may each be a different machine learning model, and may be an integrated machine learning model obtained by integrating them partially or entirely.

In addition, the scope of application of the present invention is not limited to situations where cloud gaming services are provided. The present invention can generally be applied to situations where substitute images are generated on the basis of basic images stored on the image storage section 36 in the terminal 12.

Here, for example, image data, or image data and feature-amount data may be transmitted repeatedly from the cloud server 10 to a distribution server that distributes moving images representing a situation of plays of a game. Then, the distribution server may store the image data, or the image data and the feature-amount data that is/are equivalent to a series of play images, and each associated with an order. Then, retrospectively, according to a request from a terminal used by a user viewing and listening to a moving image representing a situation of plays of the game, the distribution server may sequentially transmit, to the terminal, the image data, or the image data and the feature-amount data stored on the distribution server according to the order with which the image data, or the image data and the feature-amount data is/are associated. Then, at the terminal, processes similar to the processes executed at the terminal 12 depicted in FIG. 1 may be executed.

In addition, in a situation where a game is broadcasted, the distribution server mentioned above may transmit image data, or image data and feature-amount data to a terminal used by a user who is viewing and listening to moving images representing a situation of plays of the game in real time according to reception of the image data, or the image data and feature-amount data. Then, at the terminal, processes similar to the processes executed at the terminal 12 depicted in FIG. 1 may be executed.

Here, the cloud server 10 may also play a role of the distribution server mentioned above that transmits image data, or image data and feature-amount data to the terminal. In addition, processes similar to the processes performed by the cloud server 10 depicted in FIG. 1 may be executed at the terminal 12, and image data equivalent to a series of play images, or the image data and feature-amount data may be transmitted repeatedly from the terminal 12 to the distribution server.

In addition, specific strings and numerical values described above, and specific strings and numerical values in the figures are illustrative, and actual strings and numerical values are not limited to those strings and numerical values.

The invention claimed is:

1. An image display control device comprising:
an image data receiving section that repeatedly receives image data, wherein: (i) the image data represents a downscaled image obtained by downscaling an original image, (ii) the image data is transmitted from a transmitting device, (iii) the transmitting device further transmits feature-amount data that is associated with the image data and that represents at least one of a feature amount of the original image and a feature amount that is a parameter used in encoding of the downscaled image, and (iv) the transmitting device transmits prioritizes the transmission of the feature-amount data over transmission of the image data associated with the feature-amount data;
a to-be-displayed-image generating section that generates a to-be-displayed image on a basis of the image data;
a substitute image generating section that, on a basis of first image data that is the image data received at a first timing, generates a substitute image that is an image different from the to-be-displayed image generated on a basis of the first image data and that corresponds to second image data that is the image data planned to be received at a second timing that comes after the first timing; and
a display control section that causes either one of the to-be-displayed image generated on a basis of the second image data and the substitute image generated on a basis of the first image data to be displayed according to success or failure of the reception of the second image data, wherein
the substitute image generating section starts the generation of the substitute image corresponding to the second image data based on the first image data before the success or failure of the reception of the second image data is confirmed.

2. The image display control device according to claim 1, wherein
the image data receiving section receives the image data representing a downscaled image obtained by downscaling an original image,
the to-be-displayed-image generating section generates the to-be-displayed image having a resolution higher than a resolution of the downscaled image, and
the substitute image generating section generates the substitute image having a resolution higher than the resolution of the downscaled image.

3. The image display control device according to claim 2, wherein
the image data receiving section further receives feature-amount data that is associated with the image data and that represents at least one of a feature amount of the original image and a feature amount that is a parameter used in encoding of the downscaled image, and
the to-be-displayed-image generating section generates the to-be-displayed image on a basis of the image data, and the feature-amount data associated with the image data.

4. The image display control device according to claim 3, wherein the substitute image generating section generates the substitute image on a basis of the first image data, and the feature-amount data associated with the first image data.

5. The image display control device according to claim 3, wherein the substitute image generating section generates the substitute image on a basis of the first image data, and the feature-amount data associated with the second image data.

6. The image display control device according to claim 3, wherein, in a case where part of the second image data and the feature-amount data associated with the second image data is received, the substitute image generating section generates the substitute image further on a basis of the part.

7. The image display control device according to claim 3, wherein the feature-amount data includes data representing at least one of a feature point of the original image, an edge strength, a depth of each pixel included in the original image, a texture type of the original image, an optical flow, and information representing in which direction and at what speed a rectangular region in an image is moving.

8. The image display control device according to claim 1, wherein, in a case where part of the second image data is received, the substitute image generating section generates the substitute image further on a basis of the part.

9. The image display control device according to claim 1, wherein the substitute image generating section generates the substitute image on a basis of a chronologically ordered series of the received image data.

10. A transmitting device comprising:
an image data generating section that generates image data representing a downscaled image obtained by downscaling an original image; and
a transmitting section that transmits image data generated by the image data generating section to an image display control device,
the image display control device including
an image data receiving section that repeatedly receives the image data,
a to-be-displayed-image generating section that generates a to-be-displayed image having a resolution higher than a resolution of the downscaled image on a basis of the image data,
a substitute image generating section that, on a basis of first image data that is the image data received at a first timing, generates a substitute image that is an image different from the to-be-displayed image generated on the basis of the first image data, that corresponds to second image data that is the image data planned to be received at a second timing that comes after the first timing, and that has a resolution higher than the resolution of the downscaled image, and
a display control section that causes either one of the to-be-displayed image generated on a basis of the second image data and the substitute image generated on a basis of the first image data to be displayed according to success or failure of the reception of the second image data, the substitute image generating section starting the generation of the substitute image corresponding to the second image data based on the first image data before the success or failure of the reception of the second image data is confirmed, wherein:

the transmitting section further transmits feature-amount data that is associated with the image data and that represents at least one of a feature amount of the original image and a feature amount that is a parameter used in encoding of the downscaled image, and the transmitting section transmits the feature-amount data to the image display control device, prioritizing the transmission of the feature-amount data over transmission of the image data associated with the feature-amount data.

11. An image display control method comprising:

repeatedly receiving image data, wherein: (i) the image data represents a downscaled image obtained by downscaling an original image, (ii) the image data is transmitted from a transmitting device, (iii) the transmitting device further transmits feature-amount data that is associated with the image data and that represents at least one of a feature amount of the original image and a feature amount that is a parameter used in encoding of the downscaled image, and (iv) the transmitting device transmits prioritizes the transmission of the feature-amount data over transmission of the image data associated with the feature-amount data;

generating a to-be-displayed image on a basis of the image data;

on a basis of first image data that is the image data received at a first timing, generating a substitute image that is an image different from the to-be-displayed image generated on a basis of the first image data and that corresponds to second image data that is the image data planned to be received at a second timing that comes after the first timing; and causing either one of the to-be-displayed image generated on a basis of the second image data and the substitute image generated on a basis of the first image data to be displayed according to success or failure of the reception of the second image data, wherein the generating the substitute image corresponding to the second image data on a basis of the first image data is started before the success or failure of the reception of the second image data is confirmed.

12. A non-transitory, computer readable storage medium containing a computer program, which when executed by a computer, causes the computer to perform an image display control method by carrying out actions, comprising:

repeatedly receiving image data, wherein: (i) the image data represents a downscaled image obtained by downscaling an original image, (ii) the image data is transmitted from a transmitting device, (iii) the transmitting device further transmits feature-amount data that is associated with the image data and that represents at least one of a feature amount of the original image and a feature amount that is a parameter used in encoding of the downscaled image, and (iv) the transmitting device transmits prioritizes the transmission of the feature-amount data over transmission of the image data associated with the feature-amount data;

generating a to-be-displayed image on a basis of the image data;

on a basis of first image data that is the image data received at a first timing, generating a substitute image that is an image different from the to-be-displayed image generated on a basis of the first image data and that corresponds to second image data that is the image data planned to be received at a second timing that comes after the first timing; and causing either one of the to-be-displayed image generated on a basis of the second image data and the substitute image generated on a basis of the first image data to be displayed according to success or failure of the reception of the second image data, wherein the generating the substitute image corresponding to the second image data on a basis of the first image data is started before the success or failure of the reception of the second image data is confirmed.

* * * * *